US008676743B2

(12) United States Patent
Kumar

(10) Patent No.: US 8,676,743 B2
(45) Date of Patent: Mar. 18, 2014

(54) SPACE-TIME-NODAL TYPE SIGNAL PROCESSING

(75) Inventor: Krishna Kumar, Fremont, CA (US)

(73) Assignee: Space-Time Insight, Fremont, CA (US)

( * ) Notice: Subject to any disclaimer, the term of this patent is extended or adjusted under 35 U.S.C. 154(b) by 238 days.

(21) Appl. No.: 13/280,313

(22) Filed: Oct. 24, 2011

(65) Prior Publication Data

US 2012/0284268 A1 Nov. 8, 2012

Related U.S. Application Data

(63) Continuation-in-part of application No. 13/100,212, filed on May 3, 2011.

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search
None
See application file for complete search history.

(56) References Cited

U.S. PATENT DOCUMENTS 6,567,815 B1 5/2003 Rubin et al.
6,862,613 B1 * 3/2005 Kumar et al. ................. 709/220
7,212,217 B1 5/2007 Feather et al.
7,333,454 B2 * 2/2008 Yang et al. .................... 370/331
7,529,207 B2 * 5/2009 Jagana et al. ................. 370/331
7,843,871 B2 * 11/2010 Jagana et al. ................. 370/328
7,873,735 B2 * 1/2011 Jain et al. ...................... 709/227
7,899,456 B2 * 3/2011 Jagana et al. ............. 455/435.1
7,920,513 B2 * 4/2011 Jagana et al. ................. 370/328
7,990,924 B2 * 8/2011 Jagana et al. ................. 370/331

OTHER PUBLICATIONS

George et al., "Spatio-Temporal Sensor Graphs (STSG): A Data Model for the Discovery of Spatio-Temporal Patterns", Intelligent Data Analysis, 2009 pp. 9.
U.S. Appl. No. 13/100,212/Response to Non-Final office action, mailed Oct. 23, 2013, 19 pages.
U.S. Appl. No. 13/100,212/Final Rejection, mailed Nov. 18, 2013, 15 pages.
Niebles, et al. "Unsupervised Learning of Human Action Categories Using Spatial-Temporal Words", Int J Compt Vis, 2008, pp. 20.
U.S. Appl. No. 13/100,212, filed May 3, 2011, 110 pages.
U.S. Appl. No. 13/100,212/Notice to file missing parts and filing receipt, mailed May 17, 2011, 5 pages.
U.S. Appl. No. 13/100,212/Response to notice to file missing parts, mailed Jun. 8, 2011, 27 pages.
U.S. Appl. No. 13/100,212/Updated filing receipt, mailed Jun. 20, 2011, 3 page.
U.S. Appl. No. 13/100,212/Notice of publication, mailed Nov. 8, 2012, 1 page.
U.S. Appl. No. 13/100,212/Restriction requirement, mailed Jul. 19, 2013, 4 pages.
U.S. Appl. No. 13/100,212/Non-Final Office Action, mailed Aug. 5, 2013, 15 pages.

* cited by examiner

*Primary Examiner* — Michael B Holmes
(74) *Attorney, Agent, or Firm* — Berkeley Law & Technology Group, LLP

(57) ABSTRACT

Example methods, apparatuses, or articles of manufacture are disclosed that may be implemented using one or more computing devices or platforms to facilitate or otherwise support one or more processes or operations associated with a space-time-node engine signal processing.

53 Claims, 20 Drawing Sheets

100
102
106
Sensor 1
108
Pre-Processor (optional)
116
120
122
124
112
110
Sensor 2
114
Σ
A System of Registers for Packet Decomposition
118
Spatio-Temporal-Nodal Signal Training
Spatio-Temporal-Nodal Information Organization
Spatio-Temporal-Nodal Analysis and Presentation
104
Sensor 3
110
Sensor (n)
126
Info Acquisition Layer
128
Training & Preparation
130
Internal Organization
132
Result Presentation

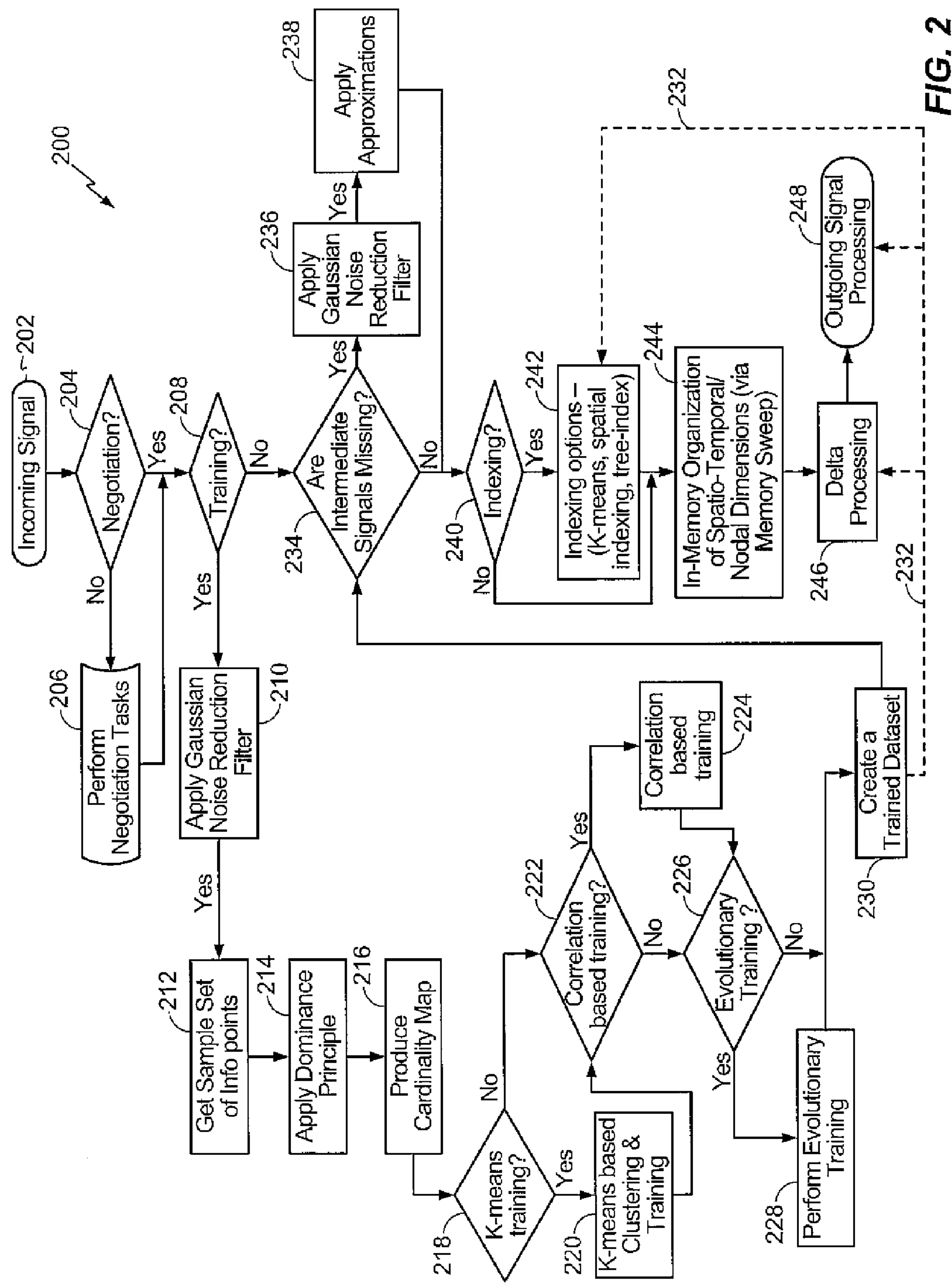
200
Incoming Signal
202
Negotiation?
204
No
Yes
Perform Negotiation Tasks
206
Training?
208
Yes
No
Apply Gaussian Noise Reduction Filter
210
Yes
Get Sample Set of Info points
212
Apply Dominance Principle
214
Produce Cardinality Map
216
K-means training?
218
Yes
No
K-means based Clustering & Training
220
Correlation based training?
222
Yes
No
Correlation based training
224
Evolutionary Training ?
226
Yes
No
Perform Evolutionary Training
228
Create a Trained Dataset
230
232
Are Intermediate Signals Missing?
234
Yes
No
Apply Gaussian Noise Reduction Filter
236
Yes
Apply Approximations
238
Indexing?
240
Yes
No
Indexing options – (K-means, spatial indexing, tree-index)
242
In-Memory Organization of Spatio-Temporal/ Nodal Dimensions (via Memory Sweep)
244
Delta Processing
246
Outgoing Signal Processing
248
232
FIG. 2

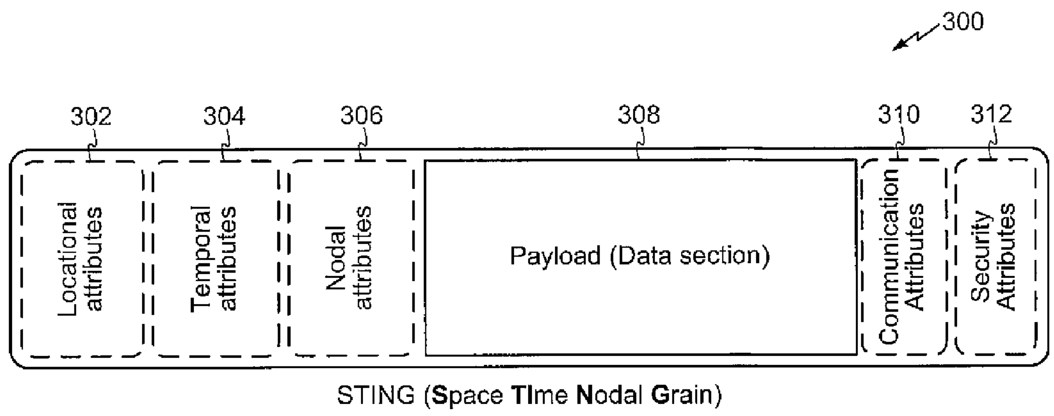
STING (Space TIme Nodal Grain)
*FIG. 3A*
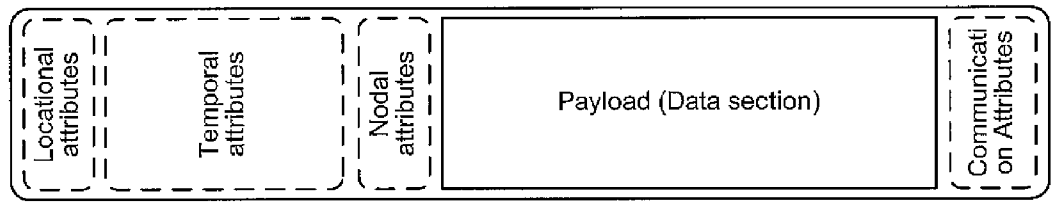
Structure of a STING whose payload changes rapidly with time (e.g. profile of an AC wave)
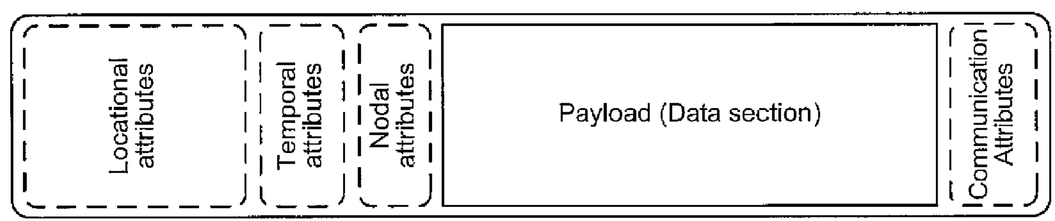
Structure of a STING whose payload changes rapidly with space (e.g. an in-flight missile)
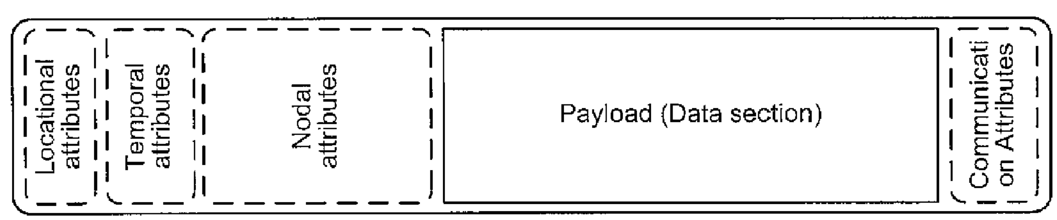
Structure of a STING whose payload changes rapidly with nodal points (e.g. electric circuit)
*FIG. 3B*

400

| | Fieldname | Source | Description | Type | allowed values |
|---|---|---|---|---|---|
| General | | | | | |
| | UUID | Vendor/Device Defined | UUID of the device type what type of device is being considered. For example it could be an IP address, MAC address, or a UID with which the device can be identified without ambiguity. | String | Any |
| | Default_Dominance_Type | Vendor/By ecosystem file | The most dominant characteristic within the Signal Vectors provided by the vendor | String | SPATIAL, TEMPORAL, NODAL, SPATIO_TEMPORAL, SPATIO_NODAL, NODAL_TEMPORAL |
| | Auto-determine_dominance_type | Vendor/Device Defined | Determine the dominance type automatically | boolean | Yes, No |
| | Default_Spatial_Resolution | Vendor/Device Defined | This is bounding box (represented by height and width in meters) | String | Any |
| | Default_Temporal_Resolution | Vendor/Device Defined | This is represented as a String for example 10 ms. Indicating 10 milli seconds | String | Any |
| | Default_Dominant_Metric_Pointer | Defined in the Ecosystem File | This field indicates the most dominant metric within a signal stream. For example for a thermostat stream, it would be a temperature field | String | Any |
| Signal Structures | | | | | |
| | Average_Data_Payload_to_communication_byte_ratio | Vendor/Device Defined | how many data payload bytes are transmitted for every communication byte | double | Any |
| | Average_Data_Payload_to_security_byte_ratio | Vendor/Device Defined | how many data payload bytes are transmitted for every security byte | double | Any |
| | Average_Data_Payload_to_temporal_byte_ratio | Vendor/Device Defined | how many data payload bytes are transmitted for every temporal byte | double | Any |
| | Average_Data_Payload_to_spatial_byte_ratio | Vendor/Device Defined | how many data payload bytes are transmitted for every spatial byte | double | Any |
| | Average_Data_Payload_to_security_byte_ratio | Vendor/Device Defined | how many data payload bytes are transmitted for every security byte | double | Any |
| | Average_Number_of_STING_cells_per_Payload | Vendor/Device Defined | how many cells does an average payload contain | integer | Any |
| Training & Indexing | | | | | |
| | Training_needed_flag | Defined in the Ecosystem File | Is training needed for processing signals | boolean | 1,0 |
| | Training_interval | Defined in the Ecosystem File | how often is training needed (how many reads) | String | sample values are 5 min, 2000 signals, 45 days |
| | Is_Correlation_training_needed | Defined in the Ecosystem File | Does you need to apply correlation based training for signal processing | boolean | Yes, No |
| | Percentage_of_points_needed_for_training | Defined in the Ecosystem File | What percentage of points are used for training | double | Any |
| | Type_of_training_factory_to_be_used | Defined in the Ecosystem File | Factory class that implements the training process | String | com.spacetimeinsight.training.PearsonsTraining |
| | What Order Derivative is needed for Pearson_training | Defined in the Ecosystem File | What derivative order is needed for training the system | integer | 0 is no derivative, 1 is dx/dt, 2 d2x/dt2, 3, 4 |
| | Clustering_needed | Defined in the Ecosystem File | Is clustering needed for training the system | boolean | Yes, No |
| | Is_Kmeans_clustering | Defined in the Ecosystem File | Is Kmeans clustering used for training the system | boolean | Yes, No |
| | Percentage_of_points_needed_for_random_in_kmeans_clustering | Defined in the Ecosystem File | What percentage of points are used for randomization that is passed to kmeans clustering | double | Any |
| | K-means_dimension_selection | Defined in the Ecosystem File | What dimensions are used for Kmeans clustering | String | e.g. (dimension_1=x, dimension_2=y, dimension_3=temperature) |
| | K-means distance calculator | Defined in the Ecosystem File | What distance calculator is used for computing signal distance | String | SPATIAL2D, SPATIAL3, SPATIO_TEMPORAL, TEMPORAL, NODAL_DISTANCE_AFFINITY, NODAL_DISTANCE_DEGREE_OF_SEPERATION |
| | Nodal_distance_calculator | Defined in the Ecosystem File | Default Nodal Distance Calculator | String | SPATIAL2D, SPATIAL3, SPATIO_TEMPORAL, TEMPORAL, NODAL_DISTANCE_AFFINITY, NODAL_DISTANCE_DEGREE_OF_SEPERATION |
| | Graph_type | Defined in the Ecosystem File | Type of Graph | String | e.g. bipartite, Cayley |
| | Nodal_Search_strategy | Defined in the Ecosystem File | Nodal Search Strategy | String | e.g. Breadth First Search (BFS) |
| | K-means_number_of_"K"_values_needed_for_clustering | Defined in the Ecosystem File | how many "K" values are needed for cluster computation | String | e.g. values are automatic, 15 clusters |
| | K_means_maximum_iterations | Defined in the Ecosystem File | Maximum number of iterations before which the Kmeans algorithm is expected to converge | double | Any |
| | K_means_convergence_distance | Defined in the Ecosystem File | Maximum distance before the system deems the convergence to have be accomplished | double | Any |
| | IndexingStrategy | Vendor/Device Defined | What indexing strategy is employed for performance optimization | String | KD-Tree, R-Tree, Bitmap, Binary Tree (BSP) |
| Signal Processing | | | | | |
| | Approximation_allowed_indicator? | Defined in the Ecosystem File | Is approximation for filling missing intermediary values | boolean | Yes, No |
| | Delta_compression_allowed_(Yes/No_flag_-_Boolean_field) | Defined in the Ecosystem File | Is Delta compression allowed | boolean | Yes, No |
| | Delta_Compression_Factory | Defined in the Ecosystem File | Determine what type of Delta compression needs to be implemented. The reference is to a factory class. The factory class ensures that the actual implementation is done by the vendor for the STING Adapter. | String | com.spacetimeinsight.training.DeltaCompression withintermediaries |
| | Delta_Threshold | Defined in the Ecosystem File | Value below which lossy compression is permitted | double | 0.01 (degrees configurable) |
| | Signal_Consolidation_Allowed | Defined in the Ecosystem File | Can Signals be consolidated and transmitted as a single value | boolean | Yes, No |
| | Manifest_Consolidation_Allowed | Defined in the Ecosystem File | Can Spatial, nodal, temporal, Security & Communication be consolidated into a single manifest | boolean | Yes, No |
| | Negotiation_spread_after_number_of_processes | Defined in the Ecosystem File | When do you want to perform the negotiation | String | sample values are 5 min, 2000 signals, 45 days |
| Memory Sweep | | Defined in the Ecosystem File | | | |
| | memory_sweep_distance_calculator | Defined in the Ecosystem File | What distance calculator is used for computing signal distance | String | SPATIAL2D, SPATIAL3, SPATIO_TEMPORAL, TEMPORAL, NODAL_DISTANCE_AFFINITY, NODAL_DISTANCE_DEGREE_OF_SEPERATION |

| | Field name | Source |
|---|---|---|
| General | | |
| | UUID | Vendor / Device Defined |
| | Default_Dominance_Type | Vendor / By ecosystem file |
| | Auto-determine_dominance_type | Vendor / Device Defined |
| | Default_Spatial_Resolution | Vendor / Device Defined |
| | Default_Temporal_Resolution | Vendor / Device Defined |
| | Default_Dominant_Metric_Pointer | Defined In the Ecosystem File |
| Signal Structures | | |
| | Average_Data_Payload_to_communication_byte_ratio | Vendor / Device Defined |
| | Average_Data_Payload_to_security_byte_ratio | Vendor / Device Defined |
| | Average_Data_Payload_to_temporal_byte_ratio | Vendor / Device Defined |
| | Average_Data_Payload_to_spatial_byte_ratio | Vendor / Device Defined |
| | Average_Data_Payload_to_security_byte_ratio | Vendor / Device Defined |
| | Average_Number_of_STING_cells_per_Payload | Vendor / Device Defined |
| Training & Indexing | | |
| | Training_needed_flag | Defined in the Ecosystem File |
| | Training_interval | Defined in the Ecosystem File |
| | Is_Correlation_training_needed | Defined in the Ecosystem File |
| | Percentage_of_points_needec_for_training | Defined in the Ecosystem File |
| | Type_of_training_factory_to_be_used | Defined in the Ecosystem File |
| | What_Order_Derivative_is_needed_for_Pearson'_training | Defined in the Ecosystem File |
| | Clustering_needed | Defined in the Ecosystem File |
| | Is_Kmeans_clustering | Defined in the Ecosystem File |
| | Percentage_of_points_needed_for_random_in_kmeans_clustering | Defined in the Ecosystem File |
| | K-means_dimension_selection | Defined in the Ecosystem File |
| | K-means_distance_calculator | Defined in the Ecosystem File |
| | Nodal_distance_calculator | Defined in the Ecosystem File |
| | Graph_type | Defined in the Ecosystem File |
| | Nodal_Search_startegy | Defined in the Ecosystem File |
| | K-means_number_of_"k"_values_needed_for_clustering | Defined in the Ecosystem File |
| | K_means_maximum_iterations | Defined in the Ecosystem File |
| | K_means_convergence_distance | Defined in the Ecosystem File |
| | Indexing Strategy | Vendor / Device Defined |
| Signal Processing | | |
| | Approximation_allowed_indicator? | Defined in the Ecosystem File |
| | Delta_compression_allowed_(Yes/No_flag)_-_Boolean_field | Defined in the Ecosystem File |
| | Delta_Compression_Factory | Defined in the Ecosystem File |
| | Delta_Threshold | Defined in the Ecosystem File |
| | Signal_Consolication_Allowed | Defined in the Ecosystem File |
| | Manifest_Consolidation_Allowed | Defined in the Ecosystem File |
| | Negotiation_reread_after_number_of_processes | Defined in the Ecosystem File |
| Memory Sweep | | Defined in the Ecosystem File |
| | memory_sweep_distance_calculator | Defined in the Ecosystem File |

*FIG. 4A*

| Description | Type | allowed values |
|---|---|---|
| | | |
| UUID of the device type-what type of device is being considered. For example it could be an IP address, MAC address, or a UID with which the device can be identified without ambiguity. | String | Any |
| The most dominant characteristic within the Signal Vectors provided by the vendor | String | SPATIAL, TEMPORAL, NODAL, SPATIO_TEMPORAL, SPATIO_NODAL, NODAL_TEMPORAL |
| Determine the dominance type automatically | boolean | Yes, No |
| This is bounding box (represented by height and width in meters) | String | Any |
| this is represented as a String for example 10 ms ..Indicating 10 milli seconds | String | Any |
| this field indicates the most dominant metric within a signal stream .. For example for a thermostat stream, it would be a temperature field | String | Any |
| | | |
| how many data payload bytes are transmitted for every communication byte | double | Any |
| how many data payload bytes are transmitted for every security byte | double | Any |
| how many data payload bytes are transmitted for every temporal byte | double | Any |
| how many data payload bytes are transmitted for every spatial byte | double | Any |
| how many data payload bytes are transmitted for every security byte | double | Any |
| how many cells does an average payload contain | integer | Any |
| | | |
| Is training needed for processing signals | boolean | 1,0 |
| how often is training needed (how many reads) | String | sample values are 5 min, 2000 signals, 45 days |
| Does you need to apply correlation based training for signal processing | boolean | Yes, No |
| What percentage of points are useful for training | double | Any |
| Factory class that implements the training process | String | com.spacetimeinsight.training.PearsonsTraining |
| What derivative order is needed for training the system | integer | 0 is no derivative,1 is dx/dt ,2 d2x/dt2,3,4 |
| Is clustering needed for training the system | boolean | Yes, No |
| Is K-means clustering used for training the system | boolean | Yes, No |
| What percentage of points are useful for randomization that is passed to kmeans clustering | double | Any |
| What dimensions are used for K-means clustering | String | e.g. {dimension_1=x, dimension_2=y, dimension_3=temperature} |
| What distance calculator is used for computing signal distance | String | SPATIAL2D, SPATIAL3, SPATIO_TEMPORAL, TEMPORAL, NODAL_DISTANCE_AFFINITY, NODAL_DISTANCE_DEGREE_OF_SEPERATION |
| Default Nodal Distance Calculator | String | SPATIAL2D, SPATIAL3, SPATIO_TEMPORAL, TEMPORAL, NODAL_DISTANCE_AFFINITY, NODAL_DISTANCE_DEGREE_OF_SEPERATION |
| Type of Graph | String | e.g. bipartite, Cayley |
| Nodal Search Strategy | String | e.g. Breadth First Search (BFS) |
| how many "k" values are nedded for cluster computation | String | e.g. values are automatic, 15 clusters |
| Maximum number of iterations before which the K means algorithm is expected to converge | double | Any |
| Maximum distance before the system deems the convergence to have be accomplished | double | Any |
| What indexing strategy is employed for performance optimization | String | KD-Tree, R Tree, Bitmap, Binary Tree (BSP) |
| | | |
| Is approximation for fitting missing intermediary values | boolean | Yes, No |
| Is Delta compression allowed | boolean | Yes, No |
| Determine what type of Delta compression needs to be implemented. The reference is to a factory class. The factory class ensures that the actually implementation is done by the vendor for the STING Adapter. | String | com.spacetimeinsight.training.DeltaCompression withIntermediaries |
| Value below which lossy compression is permitted | double | 0.01 (degrees centigrade) |
| Can Signals be consolidated and transmitted as a single value | boolean | Yes, No |
| Can Spatial, nodal, temporal, Security & Communication be consolidated into a single manifest | boolean | Yes, No |
| When do you want to perform "re-negotiation" | String | sample values are 5 min, 2000 signals, 45 days |
| | | |
| What distance calculator is used for computing signal distance | String | SPATIAL2D, SPATIAL3, SPATIO_TEMPORAL, TEMPORAL, NODAL_DISTANCE_AFFINITY, NODAL_DISTANCE_DEGREE_OF_SEPERATION |

| 502 | X Plane | Y Plane | Z Plane | T Plane | N (nodal) |
|---|---|---|---|---|---|
| S1 | x1 | y1 | z1 | t1 | n1 |
| S2 | x1 | y1 | z1 | t2 | n2 |
| S3 | x1 | y1 | z1 | t3 | n1 |
| S4 | x1 | y1 | z1 | t10 | n1 |
| S5 | x3 | y1 | z1 | t15 | n1 |
| S6 | x4 | y1 | z1 | t15 | n1 |
| S7 | x3 | y1 | z1 | t15 | n1 |

*Very moderate Nodal Movement ( n1, n2)*

*X vector changes 3 times in 4 moments*

*No-movement along the Y & Z vectors*

*Temporal moments change twice (t10, t15)*

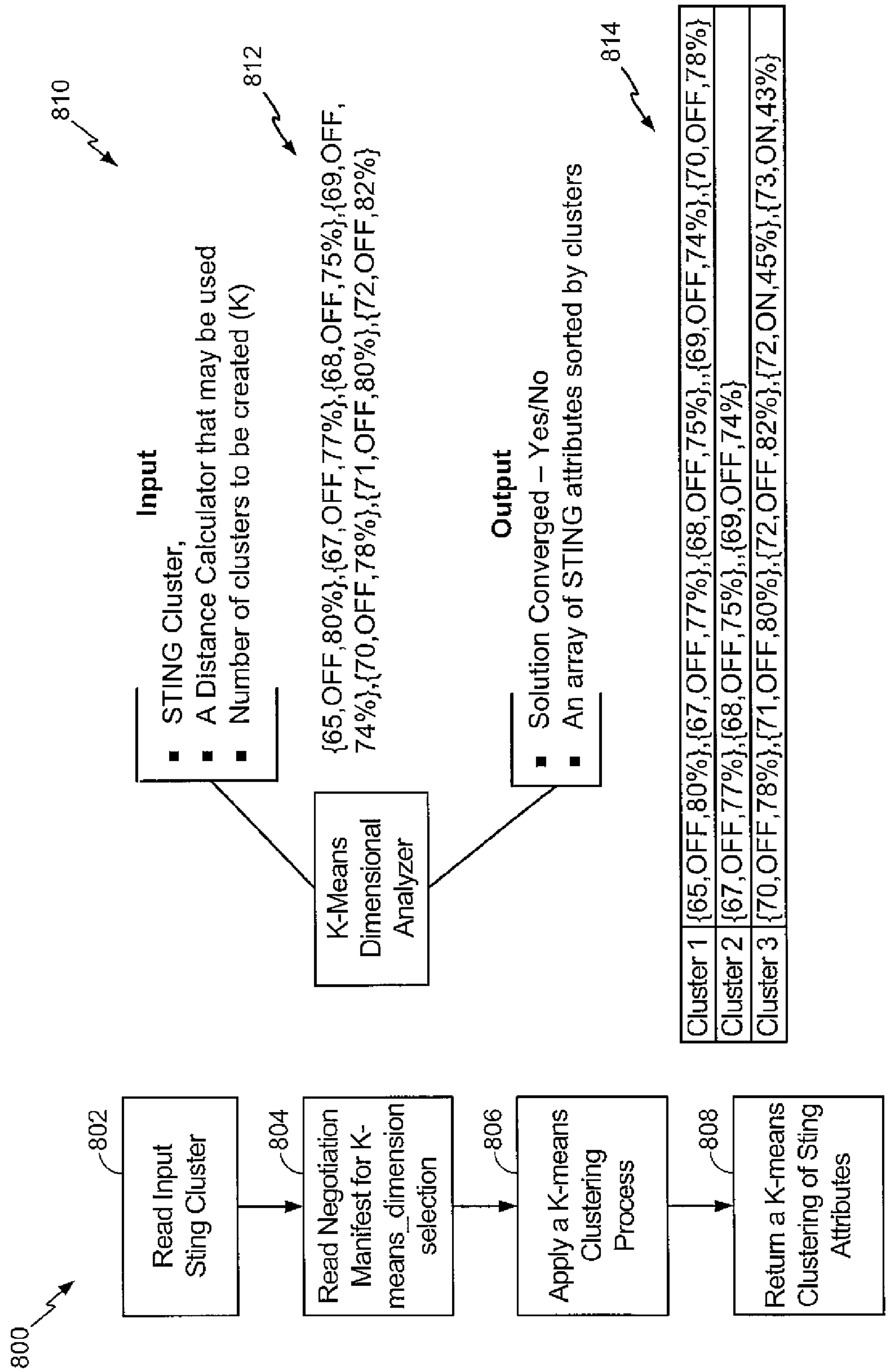
800
802
Read Input Sting Cluster
804
Read Negotiation Manifest for K-means_dimension selection
806
Apply a K-means Clustering Process
808
Return a K-means Clustering of Sting Attributes
FIG. 8A
810
Input
STING Cluster,
A Distance Calculator that may be used
Number of clusters to be created (K)
K-Means Dimensional Analyzer
812
{65,OFF,80%},{67,OFF,77%},{68,OFF,75%},{69,OFF,74%},{70,OFF,78%},{71,OFF,80%},{72,OFF,82%}
Output
Solution Converged – Yes/No
An array of STING attributes sorted by clusters
814
Cluster 1 {65,OFF,80%},{67,OFF,77%},{68,OFF,75%},,{69,OFF,74%},{70,OFF,78%}
Cluster 2 {67,OFF,77%},{68,OFF,75%},,{69,OFF,74%}
Cluster 3 {70,OFF,78%},{71,OFF,80%},{72,OFF,82%},{72,ON,45%},{73,ON,43%}
FIG. 8B

SPACE-TIME-NODAL TYPE SIGNAL PROCESSING

This patent application is a continuation-in-part patent application of U.S. patent application Ser. No. 13/100,212, filed on May 3, 2011, titled "SPACE-TIME-NODE ENGINE SIGNAL STRUCTURE," by Krishna Kumar, assigned to the assignee of the currently claimed subject matter.

BACKGROUND

1. Field

The present disclosure relates generally to signal processing and, more particularly, to space-time-nodal type signal processing.

2. Information

A wide variety of content, such as, for example, business information, social information, service information, scientific information, environmental information, or the like is continually being generated, accessed, shared, collected, communicated, stored, or evaluated. Databases or similar repositories are becoming more common place as well as related communications networks or computing resources that provide access to various types of content, typically in the form of signals or stored signals (e.g., states).

Today, a variety of sources of content, again, typically in the form of signals or stored signals (e.g., states), may be used for business decision-making, performance management, market research, situational awareness, or the like. With an overabundance of diverse content being accessible, signal processing techniques continue to evolve. At times, however, processing large amounts of content in the form of signals may prove to be a resource-demanding task, which may present a number of challenges, such as increased processing time, complexity, cost, or the like.

BRIEF DESCRIPTION OF THE DRAWINGS

Non-limiting or non-exhaustive aspects are described with reference to the following figures, wherein like reference numerals refer to like parts throughout the various figures unless otherwise specified.

FIG. 2 is a flow diagram showing aspects of the example implementation of FIG. 1 in more detail.

FIG. 3A is schematic illustration of an example implementation of a signal packet, such as a space-time-nodal grain (STING) cell.

FIG. 3B is schematic illustration of additional example implementations of a signal packet, such as a space-time-nodal grain (STING) cell.

FIG. 4 is a table providing an example implementation of an example manifest file.

FIGS. 4A and 4B are respective enlarged areas A and B of the manifest file of FIG. 4.

FIG. 8A is a flow diagram illustrating an example implementation of a clustering-type process.

FIG. 8B is a schematic representation illustrating an example implementation of a clustering-type process.

DETAILED DESCRIPTION

Figure 1:
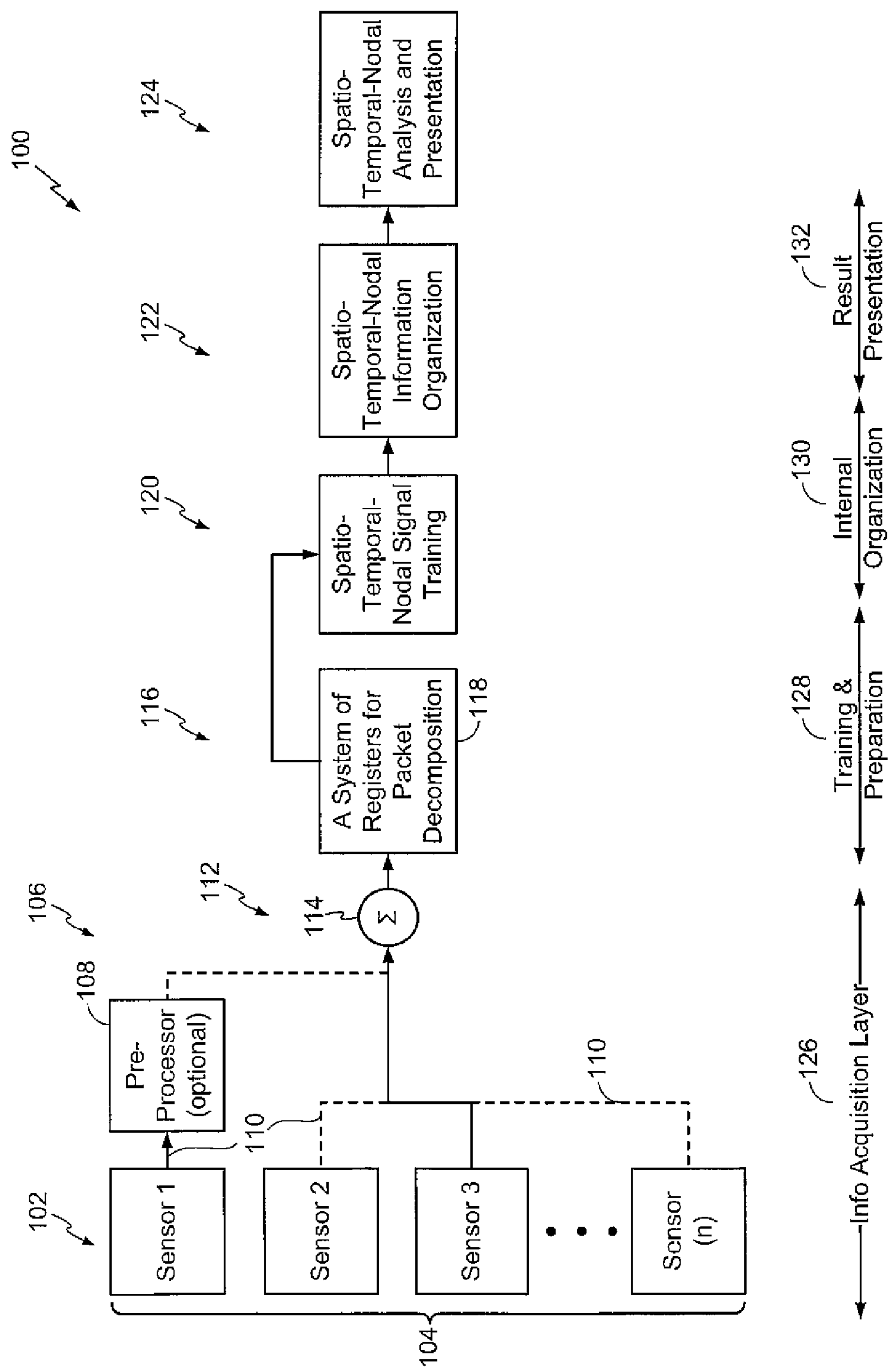
FIG. 1 is a flow diagram of an example implementation of a process for time-space-nodal type signal processing.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Example methods, apparatuses, or articles of manufacture are disclosed herein that may be implemented, in whole or in part, to facilitate space-time-nodal type signal processing. As described below, space-time-nodal type signal processing may be implemented using a variety of signal processing operations or techniques. In this context, a space-time-nodal engine may refer to a special purpose computing platform capable of executing space-time-nodal type processing signals, such as, for example, in one possible implementation as a function of spatially, temporally, or nodally-dominant attributes. In some instances, a space-time-nodal engine may comprise, for example, hardware, firmware, or software-implemented approaches, or any combination thereof (other than software per se). Signals may comprise, for example, signals or stored signals, often referred to as states. Likewise, signals may originate from a variety of sources and may, therefore, be referred to as multi-source signals. However, claimed subject matter is not limited in scope to example implementations provided merely for purposes of explanation or illustrations, such as a space-time-nodal engine, for example.

As used herein, the term signal or signals may also refer to digital signals that may, for example, be generate by signal sampling, such as in real-time, for example. Likewise, one or more signals or signals samples may be provided or acquired, for example, in a variety of formats or, as mentioned previously, may originate from a variety of sources. In this context, "real time" may refer to timeliness which may include a time delay by an amount attributable to electronic communication as well as other signal processing. A format may refer to any suitable representation associated with one or more signals or signal sample values. Signals or signal sample values may be provided or acquired in any one of a host of possible manners, including via a suitable wired or wireless communications network, for example. Typically, signals or signal sample values may represent values of measurements or values computed from measurements; however, signals or signal sample values may be representative of any type or category of available content, such as, for example, related to any one of the following: electric grid(s), smart meter(s), social media, weather, navigation, radio-frequency identification (RFID), financial markets, resource planning, asset management information, enterprise performance traffic congestion, toll collection, or any combinations thereof, to provide only a small number of illustrative examples. Signal processing, such as space-time-nodal type signal processing may in at least some embodiments employ one or more special purpose computing platforms, software application programming interfaces (APIs), communication protocols, or subscriptions or feeds, such as Open Database Connectivity (ODBC) interface, Complex Event Processing (CEP) interface, Connectivity to Supervisory Control and Data Acquisition (SCADA) or Energy Management Systems (EMS) via OLE for Process Control (POC) interface, Real Simple Syndication (RSS) or Atom Syndication (Atom)-type subscription feeds, or the like. Of course, details relating embodiments are merely illustrative examples, and claimed subject matter is, of course, not limited to an illustrative example.

Signals or signal sample values, such as representative of content of interest, for example, may be used, in whole or in part, to facilitate a variety of tasks, including, as examples, decision-making, such as business-related decision making, results evaluation, assessment of risks, management of enterprise uncertainties, understanding of supply-demand economics, development of dynamic pricing mechanisms, or the like. As a simple illustrative example, in the renewable energy sector, utility companies, independent system operators (ISO), regional transmission organizations (RTO), or the like may, at times, face deadlines to integrate mandated amounts of renewable energy (e.g., wind, solar, etc.) into an electricity transmission grid. Integration difficulties may include, for example, unpredictability or intermittency of renewable power, such as changing wind or solar patterns, balancing conventional and renewable energy sources, or the like. This may, for example, produce supply-demand shortfalls or lead to regulation, reliability, or market stability issues, among many others.

To address potential issues, content, such as environment or enterprise-related content, for example, may be provided or acquired, for example. In some instances, it may be desirable to provide or acquire content from a variety of sources in a variety of formats. For example, doing so may facilitate risk assessment, business evaluation, sector or domain applicability, or the like. Signals or signal sample values may be processed and/or may be used in a variety of ways. For example, signal processing may facilitate reduction of imbalances attributable to environmental intermittency, predictability of renewable energy production, enhancement of renewable energy reliability, or the like. In addition, in some instances, it may be desirable to provide a timely analysis to facilitate preventive maintenance, selection of suitable environmental sites for future wind or solar energy farms, or the like. It should be noted again, however, that claimed subject matter is not limited to these illustrative examples, of course.

Processing diverse signals, such as signal sample values, originating, for example, from a variety of sources and/or having a variety of formats may, however, present a number of challenges. In some instances, challenges may include, for example, increased complexity or processing time, computational or storage cost, requisite processing power, or the like. As an illustration, receiving or retrieving content to adequately address, for example, queries having n-dimensional attributes may typically, although not necessarily, involve performing a number of relatively complex or otherwise time-consuming calculations. By way of example but not limitation, a query may include "How much revenue from greeting cards was generated last Christmas around the San-Francisco Bay Area?" In this illustrative example, "greeting cards" may represent one dimension, such as node-related or nodal, "Christmas" may represent another dimension, such as time-related or temporal, and "San-Francisco" may represent yet another dimension, such as location-related or spatial, for example, in a multi-dimensional environment in which these dimensions may be associated in connection with the particular query.

As illustration of another challenge, user preferences are typically, although not necessarily, dynamic, meaning that user-specified dimensions of interest may not be known, if at all, until a query time or may change. Accordingly, it may be desirable for one or more methods, systems, or apparatuses to implement efficient or effective processing so as to at least partially predict one or more user preferences, for example, to facilitate evaluation, retrieval, reporting, presentation, etc., or any combination thereof. Of course, evaluation of a multi-dimensional query is merely an illustrative example and, again, claimed subject matter is not limited to any illustrative examples.

FIG. 1 is a flow diagram illustrating an example process 100 that may be implemented in connection with one or more signal processing techniques. In one possible embodiment, for example, signal processing may be implemented, in whole or in part, using, for example, one or more space-time-nodal related signal processing operations or techniques. For example, space-time-nodal signal processing operations or techniques may be used in connection with an in-memory architecture, as shall be described for a possible implementation. Although one or more operations are illustrated with respect to a certain sequence, other sequences, including, as example, concurrent, sequential or other than concurrent or sequential, may also be employed. In addition, although the description below references particular aspects or features, such as illustrated in the figures by one or more operations, claimed subject matter may likewise include operations having other aspects or features, such as aspects or features not described or illustrated.

As illustrated, at operation 102, one or more signals, such as may be representative of measurements of interest, may, for example, be acquired, sampled or received. For example, one or more signal acquisition devices may be schematically represented as Sensor 1, Sensor 2, Sensor 3, and so forth up through an Nth Sensor, referenced generally at 104. As used herein, the term "sensor" is to be interpreted broadly and may refer to any type of a device or system, including a special purpose computing platform, for example, capable of detecting one or more signals or signal sample values representing measurements or values calculated from measurements. In some instances, a sensor may, for example, convert an incoming or sampled signal into one or more digital numeric signal sample values for processing by an associated computing platform. Also, at times, a sensor may be capable of communicating one or more signals or signal sample values elsewhere, such as for further communicating, processing, converting, or the like. By way of example but not limitation, a sensor may be associated with, for example, an electricity transmission system or grid, Global Positioning System (GPS), supervisory control and data acquisition (SCADA) system, environmental system, BI system, asset or work order management system, etc. In some instances, a sensor may comprise one or more instrumentations associated with structured or unstructured content, such as electronic documents, RSS or Atom feeds, social media platforms or blogs, customer or service systems, smart cards or meters, etc. or any combination thereof. Likewise, signals or signal samples may in some embodiments include an embedded reference or hyperlink, such as to images, audio or video files, or other electronically available documents. For example, one type of reference that may be embedded may comprise a Uniform Resource Locator (URL) that may be used in some instances to access content. As an illustration, a sensor may facilitate communicating content of interest, such as a status update, an e-mail, an Extensible Markup Language (XML) document, a web page, a blog, a media file, or a web page pointed to by a URL, just to name a few illustrative examples.

In certain implementations, one or more signal acquisition devices 104 may comprise, for example, post-signal acquisition devices. For example, one or more available signals may be sampled. Likewise, sampled signals, if any, may be momentized, such as by conversion to a form comprising finite moments. One or more signal acquisition devices 104 may also feature a time-keeping unit, such as a GPS-enabled atomic clock, for example, to facilitate synchronization, to illustrate one possible implementation. Event synchronization may, for example, with respect to a sampled signal, provide a time, or a temporal range, at which generation, processing, communication, modification etc., may have occurred. In some instances, such as in the absence of a synchronization capability between a signal source and a signal recipient, for example, a time or place of signal acquisition or identification, if available, may be used.

At operation 106, one or more sampled signals may be processed, or "pre-processed," for example, to provide a suitable signal input/output form or representation, for example. One or more sampled signals may, for example, be processed to reduce noise, transmission errors, or the like. Any number of devices to pre-process may be utilized. Likewise, pre-processing may be optional in certain example implementations.

With regard to operation 112, one or more sampled signals may be communicated, such as from a variety of sources in a variety of formats, using any suitable communication protocols, such as, for example, HyperText Transfer Protocol (HTTP), Hypertext Transfer Protocol Secure (HTTPS), Inter-Control Center Communications Protocol (ICCP), User Datagram Protocol (UDP), File Transfer Protocol (FTP), Simple Mail Transfer Protocol (SMTP), etc., or any combination thereof. It should be noted that in certain implementations, such as in implementations where a sequence or chronology may useful, the Internet Protocol Suite, such as, for example, Transmission Control Protocol/Internet Protocol (TCP/IP) or like multi-layer protocol may be employed. Accordingly, with signals originating from diverse sources in diverse formats, example process 100 may include, for example, signal aggregator 114. Signal aggregator 114 may facilitate signal processing, which may include, for example, sampled signals having diverse format or structures, to illustrate one possible implementation. In some instances, signal aggregator 114 may, for example, perform formatting or signal processing operations, such as filtering, compressing, encoding, decoding, normalizing, de-normalizing etc., which may depend, at least in part, on a particular signal application. Of course, signal aggregator 114 is merely an illustrative example, and claimed subject matter is not so limited.

Having aggregated one or more sampled signals, if suitable, at operation 116, one or more sampled signal may be processed based, at least in part, on one or more attributes, such as may be associated with one or more sampled signals, as described below, for an illustrative implementation. For example, one or more sampled signals may be formatted in accordance with one or more signal attribute structures. In this context, the term signal attribute structure refers to an arrangement of signal sample values to form a signal packet in accordance with, in one implementation, a special purpose computing platform including programming to arrange one or more signal sample values from one or more sampled signals into a signal packet format based at least in part on one or more dominant attributes, as described in more detail later, for example implementations. Signal attributes may be representative of one or more characteristics associated with one or more sampled signals, such as, for example, spatial, temporal, nodal, communication, security, or like characteristics, or any combination thereof, as explained in more detail for example implementations. In certain implementations, one or more register may, for example, be associated with one or more signal attribute structures. For example, in one possible implementation a byte code, or other similar code, may be indicative of an attribute signal structure, such as to a special purpose computing platform. Signal sample values, for example, may be converted to an indicated signal attribute structure by a special purpose computing platform in accordance with a specified byte code, for example, provided to the special purpose computing platform.

Signal sample values of a sampled signal, for example, may be converted to a designated signal attribute structure. For example, adapter may provide, for example, a suitable interface in connection with example process 100. In some instances, an adapter may be use in connection with a signal acquisition layer, for example, so as to facilitate a common format, protocol, representation, or the like, though claimed subject matter is not so limited. An adapter may be implemented, in whole or in part, by a signal source, such as one or more sensors 104, for example, or by a special purpose computing platform associated with a source of a sampled signal. By way of example but not limitation, for example, a utility company, ISO, RTO, transportation company, pharmaceutical company, oil and gas company, consumer packaged goods (CPG) company, supply company, or the like may provide, in whole or in part, a suitable level of interoperability between one or more systems, platforms, devices, etc. associated with example process 100, such as a signal source system, a signal recipient system, a target system, etc., or any combination thereof. Therefore, one or more sampled signals may be converted to a signal attribute structure, for example, after being acquired or received depending at least in part on the particular situation. Likewise, one or more sampled signals may be converted to a signal attribute structure, for example, before being acquired or received depending at least in part on the particular situation.

In an implementation, one or more incoming sampled signals, whether received or acquired, may, for example, be partitioned for packet decomposition 118 based, at least in part, on one or more attributes associated with the signal. For example, for one possible implementation, a system of registers 118 may comprise a set of digital logic gates, such as digital "OR" gates, for example, implementing logical operations, though claimed subject matter is not so limited. For example, a signal attribute structure may be designated by a particular register signal value, such as [00001001] or [9], which may be pre-assigned or otherwise characterized so that a computing platform, for example, may decompose a signal packet into payload and other attributes, for example. As another possible illustration, if a stored register value corresponds to [2], for example, this may indicate that spatial-type processing is to be employed for an incoming signal packet.

A stored register value may, for example, indicate to programmatically execute a particular process or operation. In certain implementations, applicable codes may be characterized for a configuration or initialization-type file. By way of example but not limitation, a particular signal may be processed in a manner characterized in a negotiation manifest file (e.g., MANIFEST.MF, etc.) or INI-type file (e.g., ".INI", ".CFG", ".conf", ".TXT", etc.), though claimed subject matter is not so limited. A particular example of a negotiation manifest file, which may herein be simply called a manifest file, for example, is illustrated by FIG. 4. Of course, details relating to signal decomposition techniques, register values, or manifest files are merely illustrative examples, and claimed subject matter is not limited in this regard.

At operation 120, one or more training models or techniques, such as one or more spatial-temporal-nodal type training models or techniques, for example, may be implemented. As a way of illustration, one or more spatial-temporal-nodal type signal training models or techniques may, for example, comprise an extract, train, transform, and load (ETTL) operation, though claimed subject matter is not so limited. Particular examples of one or more training approaches that may be implemented, in whole or in part, in connection with operation 120 will be described in greater detail below. Of course, details relating to an ETTL approach that may be used are merely illustrated examples, and claimed subject matter is not so limited.

In an implementation, based, at least in part, on a training model or technique, one or more trained signal sample datasets may be generated. A trained signal sample dataset may, for example, be utilized, at least in part, in connection with one or more signal processing layers or platforms, for example. A trained signal sample dataset may, for example, characterize attributes of interest associated with one or more sampled signals. Space-time-nodal type signal processing may facilitate one or more operations associated with example process 100 based, at least in part, on observed behavior of one or more sampled signals, for example. To illustrate, in one implementation, an attribute signal structure, for example, may facilitate more effective or efficient indexing, analyzing, retrieving, or the like. In some instances, one or more attribute signal structures may arrange one or more sampled signals into a format based at least in part on dominance, for example.

In some implementations, one or more signal attribute structures may, for example, be trained to provide a signal packet arrangement in response to recognizing a sufficiently relevant change with respect to one or more attributes of interest associated with one or more sampled signals. To illustrate using a simple example, one or more attribute structures employed in connection with a sensor, for example, may be trained to recognize that a dominance relationship of sampled signal values may change over time, for example. Thus, in some instances, a training approach may utilize, in whole or in part, one or more pattern or trend estimation techniques, though claimed subject matter is not so limited. For example, one or more signal attribute structures may be trained to identify trending with respect to one or more attributes of interest associated with one or more sampled signal and may prioritize one or more dimensions based, at least in part, on dominance. More specifically, one or more signal attribute structures, such as for an electrical substation sensor, for example, may have an arrangement in a temporal dimension by prioritizing time-related attributes of a sampled signal since space or node-related attributes may change little, such as from a stationary nature of a signal source, as an example. Claimed subject matter is not limited to this particular sensor or dimension, of course.

As another possible example, a spatially-oriented signal attribute structure, for example, may be employed for temperature-related signal sample values for a number of corresponding cities (e.g., San Francisco, San Jose, etc.). Based, at least in part, on observed signal sample behavior for example, a spatially-oriented attribute structure may arrange signal sample values of sampled signals into signal packets, for example, using temperature-related signal sample values exhibiting trends associated with geographic region, season, time of year, or the like. More specifically, based, at least in part, on temperature-related pattern trending, one or more attributed structures comprising, for example, similarly trending signal sample values for San Francisco, San Jose, etc. may employ an arrangement in which other cities track a temperature of a representative city. In other words, one or more signal attribute structures may be trained to recognize, for example, that certain pattern trending with respect to one or more characteristics associated with one or more sampled signals may be indicative of a stochastically significant signal relationship. Recognizing and employing a stochastically significant signal relationship may, for example, facilitate evaluation, retrieval, reporting, presentation, or the like. For example, fewer signal sample values may be stored, processed, transmitted, etc.

In some instances, space-time-nodal type signal processing may be used, at least in part, to estimate a reliability threshold or similar threshold of one or more parameters of interest, for example. For example, a visualization or presentation framework, as one possible example, without limitation, may be utilized. For example, a parameter of interest may comprise one or more signal sample values representative of measurements, such as a temperature, pressure, speed, volume, performance, condition, or the like, or value capable of being calculated from measurements. In one implementation, an observed signal sample behavior of a parameter of interest may, for example, be compared with a forecasted parameter. Signal sample values of a parameter of interest may be adjusted or varied to indicate deviations from a forecast, for example. In some instances, a confidence level for a parameter of interest may, for example, be estimated via a function of historical parameter correlation over one or more applicable spatial-temporal-nodal dimensions. For example, a parameter confidence level may be characterized, at least in part, in terms of "closeness" of an actual versus a forecasted parameter. Likewise, more reliable or less reliable parameters of interest may, therefore, be identified, for example, and employed as appropriate. Of course, details relating to reliability of one or more parameters of interest are merely illustrative examples, and claimed subject matter is not so limited.

As will be described in greater detail below, one or more training approaches may include, for example, clustering-type training, correlation-type training, evolutionary process-type training, etc., just to name a few examples. In some instances, a training approach may employ one or more stochastic techniques, such as regression, clustering, frequency or population distribution, learning, etc. using, at least in part, historical samples, derivatives of historical samples, degree-of-separation models, or the like. In one particular implementation, prior to or concurrently with training, available signal sample values may be pseudo-randomized, such as via an application of a Brownian motion-type process, for example, to obtain one or more statistically suitable sample sets of signal sample values.

One or more attributes associated with one or more signal attribute structures may, for example, be represented via signal sample values processed in connection with an n-dimensional characterization. Signal sample values may, for example, be descriptive of one or more dominant attributes associated with one or more sampled signals. In one implementation, one or more dominant attributes of one or more sampled signals may, for example, be based, at least in part, on dominance. As used herein "dominance" refers to a process or technique of determining cardinality with respect to one or more attributes of one or more signal attribute structures associated with one or more sampled signals. In one implementation, one or more dominant attributes may be represented via, for example, one or more metrics for one or more sampled signals and, as such, may affect signal processing, organization, storage, or the like. Particular examples of dominance will be described in greater detail below with reference to FIG. 5.

With respect to operation 122, for example, one or more signal attribute structures may be organized as a function of proximity or mutually relative "distance" in a linearized in-memory array in at least one embodiment. This may facilitate information accessing, retrieving, presentation, etc., or any combination thereof. In this context, "distance" is a generalized term applicable to space related, time related, or node related dimensions. More specifically, multi-dimensional aspects of associated with sampled signals may be represented, for example, via a number of n-dimensional signal sample vectors that may be transformed to a two-dimensional space, as an example embodiment. Subsequently, signal sample values may be linearized based, at least in part, on "distance" by performing a memory sweep with respect to one or more dominant attributes of a sampled signal identified, for example, in accordance with dominance. Accordingly, based, at least in part, on space-time-node-type signal processing, one or more signal attribute structures may be organized so as to comprise, for example, a space-time-nodal type signal structure. Of course, details relating to linearization, memory sweep, or possible organization or processing approaches are merely illustrative examples, and claimed subject matter is not so limited.

At operation 124, results, such as trend analyses, performance management, market research, situational awareness, supply-demand economics, or the like may be presented in a suitable visual rendering format. For example, signal sample values from a variety of sources in a variety of formats may be presented via an interface framework to permit visualization of spatial-temporal-nodal type relationships. In some instances, results may be provided so as to visually represent relationships in a manner to facilitate identification of inferences, conclusions, or the like, to illustrate one possible implementation. By way of example but not limitation, various graphical interfaces, such as geo-spatial flow charts or diagrams, dashboard-type presentations, or like may be employed in connection with operation 124. Of course, claimed subject matter is not limited to these presentation techniques.

Accordingly, in an implementation, example process 100 may comprise, for example, a number of signal processing layers, which may correspond to one or more operations, such as signal information acquisition layer 126, training or preparation layer 128, internal organization layer 130, or result presentation layer 132. Of course, details relating to various layers, layer sequences, as well as the number of layers shown in connection with example process 100 are merely examples, and claimed subject matter is not limited in this regard.

With this in mind, attention is now drawn to FIG. 2, which is a flow diagram of an example process 200 that may be implemented, in whole or in part, to facilitate space-time-node signal processing. As illustrated, example process 200 may begin at operation 202 with one or more digital signals, such as may originate from a variety of diverse sources or may be provided in a variety of diverse formats, for example. One or more sampled signals may be momentized in an implementation, for example. A momentized signal, such as a sampled signal, may be characterized by a number of n-dimensional signal sample vectors that may be used, for example, to evaluate cardinality, such as for one or more dominant attributes, such as may be associated with one or more sampled signals, for example. Likewise, a sampled signal may be formatted in any of a variety of diverse approaches, such as, for example, using a functionally characterized format or a look up table, as described later by illustration, although claimed subject matter is not limited in scope to these example approaches. In some implementations, an adapter may comprise, for example, a space-time-nodal (STING) adapter, and an attribute signal structure may, for example, be compliant or compatible with a space-time-nodal grain (STING) format, for example In an implementation, for example, a STING adapter may be implemented, in whole or in part, by utilizing a Unified Modeling Language (UML) type diagram that may be made available, for example. Optionally or alternatively, a STING adapter may be implemented, for example, by a special purpose computing platform, such as may be associated with a source or a recipient of one or more sampled signals, for example. A UML diagram may statically or dynamically characterize a configuration, such as, for example, via a file generated by a configuration manager, as an example. In some implementations, a STING adapter may comprise a product of collaboration between parties associated with a source or recipient of one or more sampled signals, for example. By way of example but not limitation, a UML-type diagram may be utilized, in whole or in part, in connection with space-time-nodal type formatting or processing, such as illustrated, for example, in FIG. 16.

Turning now to FIG. 3A, which is a schematic illustration of an implementation of an example, an attribute signal structure, such as 300, for example may comprise a space-time-nodal grain (STING) format. In this context, "STING," "STING cell," STING signal structure," or the like including plural forms of such terms may be used interchangeably without loss of contextual meaning and may refer to an attribute signal structure comprising one or more attributes associated with one or more sampled signals. In one particular implementation, an attribute signal structure, such as illustrated by STING cell 300, for example, may generate signal packets, such as with portions containing signal-related attributes, which may be referred to as signal-related manifests or simply manifests. As illustrated, STING cell 300 may comprise, for example, spatial or locational related attributes 302, temporal related attributes 304, nodal related attributes 306, payload or information related attributes 308, communication related attributes 310, or security related attributes 312. Of course, any number or type of signal-related attributes may comprise a STING cell.

For this example, spatial or locational related attributes 302 may be employed to characterize one or more sampled signals. In some instances, spatial related attributes may include, for example, one or more latitude or longitude signal sample values, such as may identify a source or origin of a sampled signal, a geo-coded reference or literal descriptive of a signal source, or the like. One possible format for a geo-coded reference may include, for example, "Fremont, Calif., 94555," and an example of a literal may comprise a geo-hash like "9q8yyk8yuv5xw." In an implementation where a literal may be used, such as STING cell 300, for example, a negotiation operation, such as may take place between senders and recipients of signals or sampled signals, for example, may establish a geocode factory or code book, for example, for geographic coordinates. One possible example of a geocode factory may include, for example, a gazetteer service, though claimed subject matter is not so limited, of course. Geocode factories are known and need not be described here in greater detail.

Temporal related attributes 304 may likewise be employed to characterize one or more sampled signals. For example, temporal related attributes 304 may comprise a time stamp denoting a time, date, etc. at which events related to a sampled signal, for example, may have occurred, such as generation, transmission, reception, modification etc. Typically, although not necessarily, a range of values may be employed to denote timing of temporal events. In some implementations, temporal related attributes 304 may be relatively fine-grained. For example, signal sample values may have a granularity for example, up to a microsecond, though claimed subject matter is not so limited. As previously mentioned, a source or a recipient, for example, may utilize atomic clocks to facilitate synchronization, such as to reduce temporal related ambiguity, for example. In one particular implementation, a source or a recipient of one or more signals may feature GPS-enabled clocks capable of maintaining, for example, microsecond-level synchronization, at least approximately.

Nodal related attributes 306 may likewise be employed to characterize one or more sampled signals. For example, nodal related attributes 306 may comprise one or more signal sample values descriptive of a nodal relationship that is typically, although not necessarily, relational. By way of example but not limitation, a nodal relationship may comprise, for example, a socio-gram or graph-type relationship. Nodal related attributes 306 may, for example, describe nodes in a graph or socio-gram, for example, such as may be associated with one or more sampled signals. For purposes of explanation, a nodal relationship may be illustrated, for example, in connection with a query like "How many greeting cards were sold by Hallmark Cards, Inc. stores in San Francisco and San Jose?," as an example. For example, different Hallmark stores in San Francisco and San Jose may represent different nodes in a linked relationship, such as Hallmark stores, for example, that may be characterized, for example, such as in connection with a STING cell, such as 300. Nodal related attributes 306 may comprise, for example, signal sample values identifying a particular node (e.g., a particular store in San Francisco, etc.) in an interlinked hierarchy of nodes (e.g., different Hallmark stores in different cities, etc.) associated with one or more sampled signals, such as daily sales of Hallmark cards, for example. Of course, details relating to particular nodes are merely illustrative examples, and claimed subject matter is not so limited.

Payload or information related attributes 308 may comprise, for example, one or more signal sample values representing content of interest. For example, signal sample values may comprise measurements or may comprise values capable of being calculated from measurements, such as in connection with a signal source, for example. Likewise, content with respect to, for example, performance, operations, markets or other business related considerations, may be included via a payload of to be communicated signal packets in an implementation.

Communication related attributes 310 may comprise, for example, one or more signal sample values representative of communication or network-related aspects of one or more sampled signals. For example, communication related attributes 310 may be descriptive of a communication infrastructure, such as, for example source or destination addresses, bandwidth, latency, error detection checksums, transmission loss, channel noise, packet sequencing, or the like.

Security related attributes 312 may comprise, for example, one or more signal sample values representative of security-related aspects associated with one or more sampled signal. For example, security related attributes 312 may be descriptive of confidential, sensitive or personal content. As examples, this may include: identity of a source, source ownership, level of confidentiality, access privileges, or the like. For example, security related attributes 312 may facilitate limiting access with respect content to only those intended to be permitted to access it.

One or more attributes, such as may be associated with a STING cell, such as 300, for example, may be optional in certain example implementations. As a simple illustration, if a source of one or more sampled signals comprises a position-location system, such as a GPS device changing its location sporadically, frequently, or periodically, a STING cell may include a nodal related attribute in favor of, for example, a spatially related or temporally related attribute, for example. As another possible example, since typically, although not necessarily, a BI system may not provide spatially relevant content, such as measurements, for example, attributes other than spatially related attributes of an associated STING cell may be employed depending, at least in part, on an embodiment. Claimed subject matter is not limited to these particular examples, of course.

In addition, as will be described in greater detail below in connection with dominance, for example, at times, one or more attributes associated with a STING cell may dominate over one or more other attributes. Dominant attributes may, for example, be identified using, at least in part, a rate of change in a payload of one or more sampled signals with respect to a dimension, such as time, space, or node, for example. As such, granularity of a corresponding signal packet portion having a STING cell arrangement, for example, may be adjusted accordingly. By way of example, but not limitation, for sampled signals having an observed behavior exhibiting less or a smaller amount of change with respect to a particular dimension, for example, indicates dimensional attributes that may be less dominant or that may not be dominant. Again, using a simplified example, for GPS-type signals, for example, at times, a nodal related attribute may be less meaningful than, for example, one or more spatially related or temporally related attributes. Accordingly, GPS-related STING cells may, for example, communicate spatially or temporally attributes in favor of nodally related attributes. For example, in an implementation, in granularity or size of a corresponding portion of signal packets may be arranged to reflect one or more dominant attributes, such as by allocated more space to dimensionally dominant attributes at the expense of space allocated to less dimensionally dominant attributes.

As another example, sampled signals, such as a fast Fourier transform (FFT) of an alternating current (AC) signal, for example, may, at times, exhibit temporally related dominance, in which case higher granularity for temporally related attributes may be allocated. Examples of STING cell formats illustrating one or more dominant attributes are provided in FIG. 3B. Of course, details relating to one or more dominant attributes are merely illustrative examples and claimed subject matter is not so limited.

In an implementation, STING cell signal packets may so-called "committed" so as to facilitate processing of a continual signal stream of signal sample values. For example, one or more STING cell formats may be committed for one or more STING clusters. For example, a payload-to-byte ratio, average number of STING cells per payload, or the like may be committed for a particular format, for example. By way of example but not limitation, one possible format suitable for commitment may comprise an example represented in Table 1 below. Of course, this is merely one possible example format, and claimed subject matter is not so limited. As an illustration, a STING format, such as for one or more STING cells, such as in a cluster, again, as an example, may represented, for example, in connection with an Extensible Markup Language (XML) document, or the like, depending, at least in part, on an implementation. Consider, for example:

TABLE 1

| Example STING format.<br>Data stream -> y = x^2; t = t + 1; |
|---|
| {[2], 67.0009,−117.67,[4] 7.00am, [1]<br>{65,OFF,80%},{67,OFF,77%},{68,OFF,75%},{69,OFF,74%},<br>{70,OFF,78%},{71,OFF,80%},{72,OFF,82%},{72,ON,45%},<br>{73,ON,43%}, 117.14.56.34 , 67kb/sec}<br>+<br>{[2], 67.0009,−117.67,[4] 7.00am, [1]<br>{65,OFF,80%},{67,OFF,77%},{68,OFF,75%},{69,OFF,74%},<br>{70,OFF,78%},{71,OFF,80%},{72,OFF,82%},{72,ON,45%},<br>{73,ON,43%}, 117.14.56.34 , 67kb/sec}<br>+<br>{[2], 67.0009,−117.67,[4] 7.00am, [1]<br>{65,OFF,80%},{67,OFF,77%},{68,OFF,75%},{69,OFF,74%},<br>{70,OFF,78%},{71,OFF,80%},{72,OFF,82%},{72,ON,45%},<br>{73,ON,43%}, 117.14.56.34 , 67kb/sec} |

As seen, a suitable format may comprise, for example, a string of STING cell signal packets clustered via a "+" notation, wherein a string may comprise one or more signal sample values. For purposes of illustration, assume a signal source is realized herein as a thermostat, though claimed subject matter is not so limited. For this example, a STING cell signal packet may comprise a spatially related attribute characterized via a register value [2] with latitude-longitude signal samples values of 67.0009,-117.67, a temporally related attribute characterized via a register value [4] of 7.00 am, a payload characterized via a register value [1] represented as signal sample values with respect to a temperature (e.g., 65, etc.), operating state (e.g., OFF, etc.), or energy efficiency (e.g., 77%, etc.) of a thermostat, or:

{65,OFF,80%},{67,OFF,77%},{68,OFF,75%},{69,OFF, 74%},{70,OFF,78%}, and a communication related attribute comprising an IP address (e.g., 117.14.56.34, etc.) and an transfer rate (e.g., 67 kb/sec, etc.).

To indicate a type of signal processing to be applied (e.g., spatial, temporal, etc.), such as, for example, at operation 116 of FIG. 1, a format may reference a suitable relation. Again, a simplified illustrative example may comprise a parabolic trajectory y=x^2. Thus, a functional or operational closed form relation may be utilized, at least in part, in instances where one or more aspects of one or more sampled signals appear to be sufficiently predictable or stationary. Another simplified example may include signal sample values associated with a sine wave of an AC signal, for example. If a sampled signal or a part of a sampled signal is sufficiently predictable or stationary, a functional or operation relation may be used instead of or in addition to signal sample values. This may reduce a load on computational resources or memory resources, for example, in addition to other possible benefits.

In addition, a script, such as, for example, <1++> may be utilized to indicate a processing increment in connection with sampling a signal. As a non-limiting example, script may be useful for processing one or more temporally related attributes. For example, a sequence-type operation may be initiated in accordance with a specified script, such as after a time delay of a specified amount of time in terms of seconds, minutes, etc. To illustrate with further examples, a temporally related attribute, such as time stamp, fomay be increased by 1 second, minute, etc. based, at least in part, on a [t=t+1__________] formulation that may be specified for an implementation, for example. Accordingly, instead of or in addition to {1997-07-16T19:20+01:00} notation, other formats may also be employed, such as, for example: {1997-07-16T19:<1++>+01:00}. Claimed subject matter is not so limited, of course.

A STING cluster may comprise STING cell signal packets and may be characterized, at least in part, in a manifest file by specifying, for example, a payload-to-byte ratio of sampled STING cell signal packets, just to illustrate one possible implementation. FIG. 4 illustrates an example manifest file 400 that may be utilized in whole or in part, in connection with one or more operations, such as may be associated with example process 200. Briefly, in this illustrated example, manifest file 400 may comprise a number of fields, which may be employed to facilitate one or more operations, such as with respect to signal processing, training, indexing, or the like. Manifest file 400 may also specify a format that may be used, such as a STING cell format, for example, which may, of course, depend, at least in part, on a particular application. As seen, in one implementation, a payload-to-byte ratio of 400:10 or 40 may be used, such that a STING cluster may be generated using a particular ratio, for example. Of course, descriptions relating to payload-to-byte ratios or manifest file are merely illustrative examples, and claimed subject matter is not limited in this regard.

Referring back to FIG. 2, at operation 204, negotiation, such as between a signal source and a signal recipient of a sampled signal, for example, may take place. Typically, although not necessarily, negotiation may comprise an operation, such as, in which a computing platform associated with a source, for example, may communicate with a computing platform associated with a recipient, regarding, for example one or more attributes, such as one or more attributes discussed above in connection with FIG. 3A. For example, a source may negotiate with a recipient using applicable terms of negotiation by employing a file characterizing a negotiation-related operation or process, such as manifest file 400 of FIG. 4, for example. Negotiation-related fields may correspond to a Universal Unique Identifier (UUID) embedded in an attribute signal structure, for example, such as a STING cell format, such as for cell signal packet 300, for example. Typically, although not necessarily, a UUID may comprise suitable identification credentials (ID) associated with a participant in connection with a suitable device, applicable manifest file, or the like. By way of example but not limitation, terms of negotiation may include those listed in negotiation-related fields in manifest file 400, though claimed subject matter is not so limited. Source-recipient negotiation techniques are generally known and need not be described here in greater detail.

At operation 208, training may be employed, such as signal sample values available via one or more STING cell signal packets. As described below, based, at least in part, on applicable training, one or more trained signal sample datasets may be generated. One or more trained signal sample datasets may, for example, facilitate more effective or efficient processing, indexing, organizing, processing, visualizing, reporting, or the like. In one implementation, for example, training-related fields in a manifest file, such as manifest file 400, may be employed. For example, training-related fields may be characterized, such as by a configuration manager, for example. If training is to be employed example process 200 may continue to operation 210. Otherwise, a process may proceed to operation 234.

Figure 6:
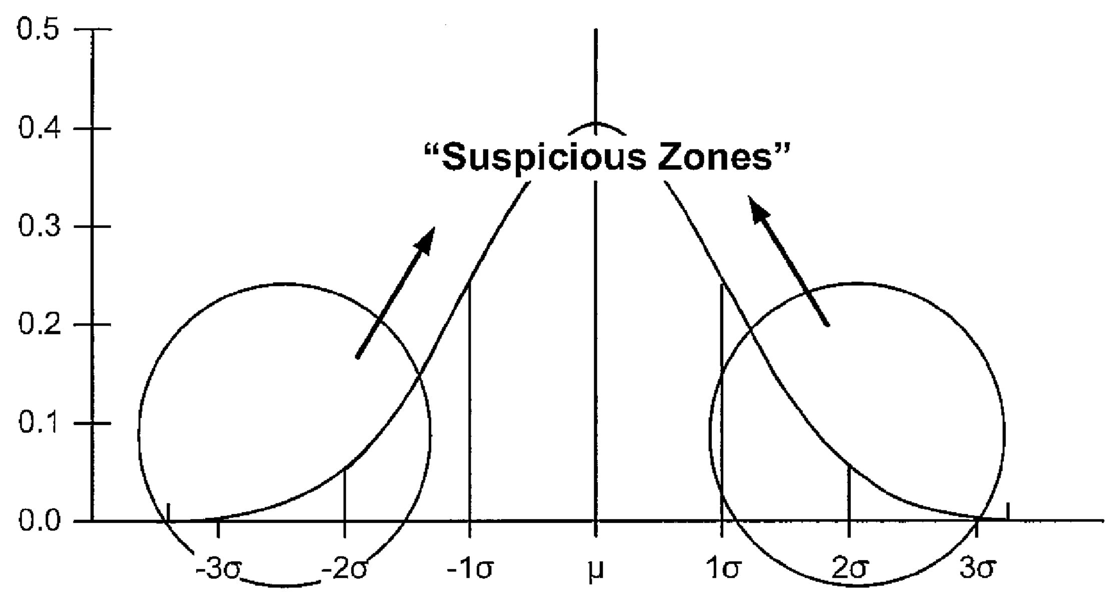
FIG. 6 is a plot providing an example implementation of a Gaussian filter.

With regard to operation 210, a Gaussian filter may be employed in connection with a stream of STING cell signal packets. For example, one or more STING cell signal packets with spurious signal sample values representative of incorrect or corrupted signal sample values may be addressed. As previously mentioned, a sampled signal may be momentized, for example, as:

$$S_i=\{x_i,y_i,z_i,t_i,N_i,v1_i,v2_i\ldots\}$$

where parameters, such as x, y, z, t, N, v1 or v2, comprise signal sample value vectors, and i comprises a whole number index parameter. Signal sample value vectors may account for one or more properties of one or more sampled signals, such as may be associated with a source and may, for example, be representative of sample measurement values or sample values capable of being computed from sample measurement values, such as, for example, temperature, pressure, speed, etc., or any combination thereof. To reduce noise, for example, a Gaussian filter may be employed with sample values out of side of a number of sample standard deviations (e.g., variations from a sample mean or sample average of signal sample values, etc.) may be considered as noise or error and, as such, may be appropriately addressed. More specifically, for one or more signal sample value vectors, sample standard deviations $\sigma_i$ may be conventionally computed as:

$$\sigma_1 = \sqrt{\frac{1}{n}\sum_{i=1}^{n}(v1_i-\mu_1)^2} \quad (1)$$

$$\sigma_2 = \sqrt{\frac{1}{n}\sum_{i=1}^{n}(v2_i-\mu_2)^2}$$

where $\mu_1$ and $\mu_2$ denotes, for example, respective sample means or sample averages. By way of example but not limitation, a number of sample standard deviations of 3 or higher may be used as a cut-off threshold, to, for example, reducing spurious sample values of one or more sampled signals. Accordingly, as seen in FIG. 6, signal sample values in "suspicious zones" may be considered as noise or error and may addressed appropriately. Of course, this is merely an example of one or more thresholds that may be used in connection with a Gaussian filter, and claimed subject matter is not so limited.

At operation 212, one or more sets of signal samples comprising signal sample values may be selected, such as, for example, for training. It should be noted that any suitable technique may be employed for selection. In one implementation, a sample set may be generated via selection, for example, using a pseudo-randomization technique, though claimed subject matter is not so limited. For example, a stream of STING cell signal packets comprising signal sample values may be stored, such as in a suitable in-memory appliance, database, file memory system, or like information repository. A number of samples to be selected may depend, at least in part, on available samples, such as, for example, STING cell signal packets forming a STING cluster in an implementation. In some instances, for training, for example, samples to be selected may be characterized in a manifest file as a percentage of available samples. For example, based, at least in part, on a number of rows or columns of a cluster in a STING cluster of samples, a number of samples for a training set may be computed using a percentage of samples available, such as a percentage of a number of rows or a number of columns of samples of a cluster. By way of example but not limitation, if there are 10 million in-memory rows, 5% may indicate that 500,000 rows may be utilized for a training sample set. In one implementation, a technique of selection via pseudo-randomization may be performed via a SELECT statement executed with respect to sample set stored in a database, such that:

```
SELECT TOP 10000 UUID, NewID( ) as Random FROM
    STING_CLUSTER ORDER BY Random
```

Accordingly, for this example, 10,000 random samples may be selected for training. Of course, this is merely one possible implementation. Techniques other than pseudo-randomization may also be utilized in connection with operation 212.

With regard to operation 214, dominance may be employed with respect to a set of STING cell signal packets, such as in connection with one or more sampled signal sources, for example. Dominance may refer to a process of assessing or measuring cardinality, such as with respect to one or more attributes associated with one or more STING cell signal packets, for example. In some instances, dominance may be employed, for example, to potentially identify latent relationships associated with one or more sampled signals. In one implementation, dominance may be employed, for example, to identify one or more attributes among a number of attributes, such as associated with signal sample values, such as attributes discussed above in connection with FIG. 3A, for example, that may be potentially dominant.

Figures 5, 16:
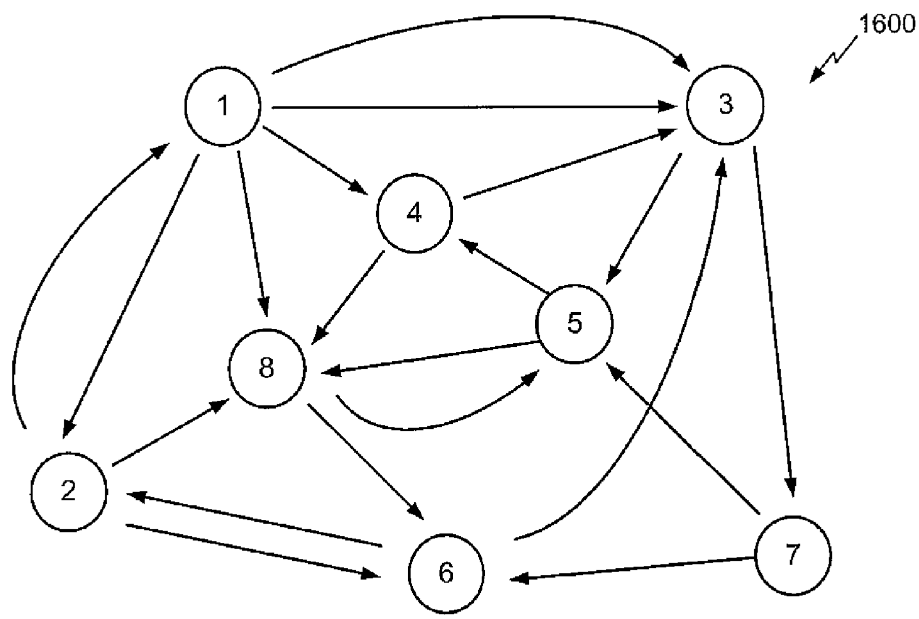
FIG. 5 is a table providing an example implementation of dominance.
FIG. 16 illustrates an implementation of an example graph.

Attention is now drawn to FIG. 5, illustrating an example of employing dominance. AN incoming stream of signal sample values may, for example, be representative of one or more sampled signals. For example, one or more sampled signals may be momentized to generate samples of n-dimensional signal sample vectors. For an example implementation, momentized signal sample vectors may comprise, for example, signal vsample ectors S1 through S7, as illustrated generally at 502. As seen, a signal sample vector may be characterized, for example, by one or more dimensions, such as a plane, indicated generally at 504, corresponding to one or more attributes associated with one or more sampled signals. For example, X, Y, and Z dimensions may correspond to spatially related attributes, such as latitude, longitude, and/or altitude, respectively; a T dimension may correspond to temporally related attributes; and an N dimension may correspond to nodal related attributes. As previously mentioned, a nodal relationship may typically, although not necessarily, comprise relational features. A nodal relationship may be represented, for example, via a socio-gram or graph-type relationship in an implemetnation. Nodally related attributes, thus, may be characterized, for example, in connection with a nodal domain, such as nodal domain N. However, it should be noted that the term "nodal dimension" may be used interchangeably with the term "nodal domain" without loss of meaning or context. In an example, a momentized sampled signal may be represented via samples of n-dimensional signal sample vectors S (n)={X, Y, Z, T, N}. It should be noted that Z or an altitude-related dimension may be optional in some example implementations. Of course, these are merely examples of various signal vectors, dimensions, or attributes that may be utilized in connection with dominance, and claimed subject matter is not so limited.

It may be observed that for S1, S2, and S3 signal vectors, X, Y, Z, and N dimension or plane-related moments may change relatively little. On the other hand, T plane-related moments may change from t1 to t10, which may indicate that one or more time-related attributes of one or more STING cell signal packets may dominate or exhibit a degree of cardinality. Typically, although not necessarily, a cardinality of a set may refer to a measure of a number of stochastically independent elements of a set. For purposes of explanation, a set A={2, 4, 6} includes 3 elements and has a cardinality score of 3. As also seen, signal vectors S4 to S7 may change in accordance with an X plane projection by a cardinality of a count of 3 (e.g., {x1,x3,x4,x3}), and may also change twice or have a cardinality score of 2 (e.g., {t10,t15}) in accordance with a T plane projection. Thus, cardinality of a sampled signal, such as with respect to a spatial, temporal, or nodal dimension, for example, may be assessed at least in part in accordance with identifying a number of stochastically independent elements represented via changing moments in a set represented via or projected to respective dimensions or planes. Accordingly, based, at least in part, on dominance, signal sample vectors S1, S2, and S3 may be identify as temporally dominant (e.g., by projection along a T plane), and that signal vectors S4, S5, S6, and S7 may be identified as spatially dominant (e.g., by projection along an X plane). Of course, this is merely one possible illustrative example of an dominance; claimed subject matter is not limited in scope to any illustrative example. For example, suitable approaches, such as, for example, approaches utilizing, for example, bijective, injective, or surjective operations, cardinal or ordinal numerals etc. may also be employed.

One or more attributes, such as with respect to one or more sampled signals, may be identified as dominant, at operation 216. In an implementation, a cardinality visual depiction, such as a map, for example, or a cardinality operational depiction, such as a table, for example, may be generated. Although claimed subject matter is not so limited, a cardinality map may, for example, be initially represented via a suitable table, such as a table illustrated in FIG. 5. Based, at least in part, on a suitable representation, a format for a map to measure a degree of cardinality may include identifying one or more dominant attributes, such as by projection, for example, spatial, temporal, or nodal dimensions, such as the example illustrated in Table 2 below. Claimed subject matter is not so limited, of course.

TABLE 2

| Example format for a cardinality depiction. |
|---|
| X-cardinality = Select (distinct) X from Signal_samples where signal vector between S1 and S7 |
| Y-cardinality = Select (distinct) Y from Signal_samples where signal vector between S1 and S7 |
| Z-cardinality = Select (distinct) Z from Signal_samples where signal vector between S1 and S7 |
| T-cardinality = Select (distinct) T from Signal_samples where signal vector between S1 and S7 |
| N-cardinality = Select (distinct) graph_relationship(N) from Signal_samples where signal vector between S1 and S |

As previously mentioned, a nodal relationship may typically, although not necessarily, comprise relational features and may be represented, for example, via a socio-gram or socio-graph, such as having a number of nodes connected together by associational links or edges, for example. To determine one or more dominant attributes of a node, referred to as N-cardinality, signal sample values originating from identifiable nodes of a graph or other depiction, such as, for example, signals sampled in connection with a particular Hallmark store in San Francisco, as discussed above, may be used. As seen in Table 2 above, in one implementation, the notation "graph_relationship (N)" may be utilized to characterize a nodal type relationship, such as between nodes of a graph for an N-related domain, for example. A nodal type relationship may, for example, in some implementations be represented via a directed graph, undirected graph, or any combination thereof. Of course, details relating to N-related cardinality are merely illustrative examples, and claimed subject matter is not limited in this regard.

Referring now to FIG. 2, at operation 218, a particular type of training, such as, for example, clustering-type training may be employed. Clustering-type training may utilize a process, such as, for example, a k-means-type process, though claimed subject matter is not so limited. As previously mentioned, training may be implemented, for example, so as to identify potentially latent relationships, such as between sampled signals, for example. In an implementation, atype of training, training intervals, or other training-related processes may, for example, be characterized in whole or in part, in a suitable configuration or initialization-type file, such as manifest file 400, to illustrate one possible implementation.

Continuing with example process 200, if training is to be employed, such as, at operation 220, a process may implement, for example, a clustering-type training. In some instances, a clustering-type training may include, for example, k-means clustering of STING cell signal packets to identify potentially spatially, temporally, or nodally-dominant clusters or cluster zones. By way of example but not limitation, in one implementation, a "k" value of 3 may be used. For example, a cluster map or other cluster depiction comprising, for example, spatially, temporally, and nodally-oriented clusters may be generated. In one implementation, clusters may be generated by partitioning signal sample values, such as available via STING cell signal packets to potentially identify one or more dominant attributes. By applying k-means-type clustering, for example, an n-dimensional signal sample vector with one or more dominant attributes may, for example, be potentially identified in accordance with a cluster formed proximate to a mean sample value, for example. In an implementation, for example, relationships, such as potential latent relationships, such as between signal sample vectors, may be identified based, at least in part, on proximity, which may be computed, for example in accordance with mutually relative dimensional "distance," such as between samples comprising one or more k-means clusters. For example, in an implementation, dimensional distance may be calculated, for example, via a metric characterized with respect to spatial, temporal, or nodal relationships or any combination thereof. In some instances, dimensional distance between calculated via a Hamming distance-type function, jo illustrate a possible implementation. However, these are merely illustrative examples of clustering-type training, and claimed subject matter is not limited in scope in these respects. [stop]

At operation 222, correlation-type training may be employed. For example, training-related fields in manifest file 400 may be referenced in an implementation. If correlation-type training is to be employed, example process 200 may continue to operation 224. In an implementation, correlation-type training may employ, for example, a Pearson's correlation coefficient to identify potential latent relationships with respect to STING cell signal packets representative of one or more sampled signals. For example, a potentially latent relationship between sampled signals may be identified using statistically relevant signal sample value trends, such as with respect to time, for example. Accordingly, a training approach may employ, for example, a rate of change of signal sample vectors with respect to time or so-called signal sample vector derivatives. More specifically, a forecasted and a computed Pearson's coefficient for signal sample value stream may be respectively computed, such as by utilizing values of corresponding n-dimensional signal sample vectors and associated first, second, and third-order derivatives in an implementation. In this context, a second-order derivative may refer to a derivative of a first-order derivative, a third-order derivative may refer to a derivative of a second-order derivative, and so forth. Signal sample values with sufficient degrees of correlation may, for example, be stored in memory as part of a trained signal sample dataset and may be applied in connection with one or more operations, such as associated with example process 200, for example.

Example process 200 may proceed to operation 226 if evolutionary training is to be employed. Although claimed subject matter is not limited in this respect, a process may reference one or more evolutionary training-related fields in a suitable initialization-type file, such as manifest file 400, for example. For example, in one implementation, a genetic process may be employed so as to facilitate a characterization of a fitness function. In an implementation, a fitness function may be characterized, for example, via one or more proximity-type parameters, such as a dimensional distance between signal sample vectors within an n-dimensional space, for example. A dimensional distance may, for example, be computed based, at least in part, on one or more dimensional distance calculators. A dimensional distance calculator may, for example, reference one or more corresponding fields in manifest file 400, to illustrate one possible implementation.

Continuing with operation 228, during initialization of evolutionary training in one implementation, one or more chromosomes and associated component genes, for example, may be generated. In an implementation, a gene may be represented via one or more signal sample values in a binary, string, numeric, etc. format and may, for example, be communicated via or otherwise associated with a payload. To illustrate, a chromosome may, for example, comprise or otherwise be associated with a temperature control system, such as a thermostat having genes specifying an operating state, temperature, ambient condition, or the like. An initial set of samples may, for example, be collected as a population and organized in memory. A suitable parent set may be selected. Based, at least in part, on a proximity-type fitness function, for example, one or more "child" signal sample values may be generated. Fitness may be evaluated in accordance with a dimensional distance between a child sample and an appropriately fit predicted child sample, which may be ascertained, at least in part, from training in an implementation. Of course, this is merely one example approach relating to evolutionary training, and claimed subject matter is not so limited.

A signal sample dataset may, for example, characterize one or more attributes, for example, to identify potential latent relationships. For example, if observed signal sample behavior suggests that signal sample values correlate sufficiently well with respect to one or more dimensions, for example, a process may implement one or more operations in a manner to conserve resources in an implementation. To illustrate, if it is observed that signal sample values for two sampled signals are trending sufficiently similarly, for example, then signal sample values indexed in a manner to conserve computational resources, memory space, or the like. For example, sample values may be indexed partially to reduce index size, for example. Of course, this is merely one possible example and claimed subject matter in so limited.

A process may continue to operation 230. In one implementation, as a result of one or more training operations, such as operations 220, 224, or 228 described above, for example, one or more trained signal sample datasets may be generated. As schematically illustrated by dashed arrows at 232, a trained signal sample dataset may be utilized in connection with one or more operations, such as associated with example process 200. In an implementation, a trained signal sample dataset may be utilized, for example, in connection with delta processing at operation 246, outgoing signal processing at operation 248, indexing at operation 242, or other potential operations, such as may be associated with example process 200.

With regard to operation 234, one or more intermediate signals or signal sample values may potentially be missing or corrupted in an implementation. Missing or corrupted signals or signal sample values may, for example, affect evaluation of one or more sampled signals and may lead to or result in less effective or efficient processing, presentation, or the like. A Gaussian filter may be employed such as, for example, in a manner described above in connection with operation 210. Example process 200 may proceed to operation 238, so that, for example, an error approximation operation may be executed. In an implementation, signal sample values may be interpolated, such as, for example, to substitute for missing or corrupted signal sample values. For example, one or more statistically acceptable approximated signal sample values may be employed. In one implementation, a Shepard's method may be utilized, for example, to approximate signal sample values by applying weighted functions assigned to samples of a set of signal sample values based, at least in part, on one or more dominant attributes.

Example process 200 may likewise proceed to operation 240 for indexing to be employed. If indexing is not to be employed, a process may by-pass operation 242 and may continue at operation 244. Indexing, however, may typically, although not necessarily, be used to facilitate signal processing, such as by providing options for signal sample retrieval, or the like using appropriate techniques. At operation 242, in an implementation, by way of example but not limitation, indexing may be characterized in a manifest file, such as manifest 400, for example, any suitable indexing techniques or processes, such as k-means indexing, spatial query indexing, tree-indexing, etc. may be used at operation 242. Various indexing techniques are known and need not be described here in greater detail. For example, in one implementation, indexing may be performed using one or more commercially available statistical libraries. In an implementation, operation 242 may be optional, in which case example process 200 may proceed from operation 240 to operation 244.

At operation 244, an n-dimensional signal attribute structure may be organized systematically in accordance with one or more STING cell formats. In an implementation, a space-time-nodal related attribute signal structure may, for example, be organized linearly. For example, signal sample values may be organized based, at least in part, on one or more dominant attributes linearized substantially in accordance with a mutually relative dimensional distance. For example, in an implementation, a memory sweep may be executed with respect to one or more STING clusters having spatially, temporally, or nodally-dominant attributes.

As referenced at 246, example process 200 may implement a delta processing operation so as to compress one or more signal sample values, for example. Delta processing operation 246 may be implemented, in whole or in part, to reduce consumption of available resources, such as, for example, memory space, transmission bandwidth, storage size, or the like. Delta processing operation 246 is illustrated in connection with a certain processing sequence, such as following operation 244, for example; however, delta processing operation 246 may be implemented in connection with any suitable processing sequence, including, for example, concurrently, sequentially or another processing sequence.

One or more types of compression, such as lossy compression, lossless compression, or the like may be employed in an implementation. Compression techniques may facilitate reduction of statistical or perceptual redundancy. By way of example but not limitation, types of delta compression that may be implemented or other compression-related operations may be characterized, at least in part, in a suitable manifest file. Examples of delta processing operations to compress one or more signal sample values will be described in greater detail below with reference to FIGS. 13-15

With regard to operation 248, one or more STING cell signal packets may be processed for example, to facilitate visualization or presentation of one or more spatial-temporal-nodal type relationships of interest. For example, in an implementation, signal processing may comprise, for example, a de-serialization operation of one or more linearized in-memory locations. In some instances, an output rendering format may comprise, for example, a raster or vector output format.

Referring now to FIGS. 8A-15 illustrating example implementations of one or more processes in connection with one or more training approaches, such as clustering-type training or correlation-type training, for example, that may be implemented, at least in part, in connection with operations 220 or 224 of FIG. 2, respectively. As previously mentioned, based, at least in part, on training, one or more trained signal sample datasets may be generated. FIG. 8A is a flow diagram illustrating implementation of an example k-means clustering-type process 800 that may be implemented, in whole or in part, in connection with clustering-type training. Example process 800 may begin at operation 802 with storing signal sample values, such as for one or more STING clusters, such as, for example, one or more clusters discussed in connection with Table 1 above. In one implementation, for example, a process may, for example, reference a suitable manifest file as indicated generally at operation 804. By way of example but not limitation, a "k-means_dimension_selection" field or property within a suitable manifest file (e.g., manifest file 400, etc.) may be used, to illustrate one possible implementation.

With regard to operation 806, a k-means clustering-type process may be employed. For example, one or more STING clusters represented via n-dimensional signal sample vectors associated with one or more sampled signals may be used in an implementation to generate an array of samples comprising one or more cluster zones. In one implementation, a "k" value of 3 may be used, for example. Thus, an array of three sorted cluster zones may be generated, in this example though claimed subject matter is not so limited. Cluster zones may, for example, be arranged based, at least in part, on relative mutual dimensional distance or proximity, to illustrate one possible implementation. For example, dimensional distance may comprise mutually relative dimensional distance that may be calculated using a distance calculator. A distance calculator may, for example, utilize or employ a dimensional distance-type metric, such as a Euclidian distance-type metric, Hamming distance-type metric, etc., or any combination thereof. At operation 808, a k-means cluster of STING attributes may be generated. For example, in an implementation, STING attributes of sampled n-dimensional signal sample vectors interest may be grouped into an array substantially in accordance with proximity to a sample mean. Of course, details relating to distance-type metrics are merely illustrative examples, and claimed subject matter is not limited in these regards.

FIG. 8B is a schematic representation 810 of an implementation of an example k-means clustering-type process, such as process 800 of FIG. 8A, for example. As illustrated, to initiate a process, one or more attributes may be characterized, for example, such as one or more attributes associated with one or more samples signals. As referenced by an arrow at 812, a STING cluster may comprise, for example, one or more signal sample values representative of measurement values of interest in a suitable format, or values capable of being calculated form measurement values, such as thermostat-related signal sample values, to illustrate one possible implementation. Thermostat-related signal sample values may comprise, for example, a temperature (e.g., 65, etc.), operating state (e.g., OFF, etc.), energy efficiency (e.g., 77%, etc.), or like signal sample values sampled from a source thermostat. Claimed subject matter is not so limited, of course. As also illustrated, an applicable distance calculator, such as a k-means distance calculator, for example, may be specified, such as via a manifest file, as indicated. In one implementation, a k-means distance calculator may be utilized, as least in part, to compute, for example, a k-means centroid for one or more STING clusters using one or more appropriate techniques. Examples of one or more distance calculators will be described in greater detail below.

A k-means clustering-type process may typically, although not necessarily, at least approximately converge to a set of one or more signal sample values representative of one or more STING attributes with respect to one or more k-means STING clusters or cluster zones. For example, one or more attributes may, for example, be grouped together so as to comprise an array arranged substantially in accordance with by one or more STING clusters or cluster zones. As illustrated by an arrow at 814, in one implementation, a suitable format may comprise, for example, an array of STING attributes sorted by STING cluster having, for example, thermostat-related signal sample values. Of course, claimed subject matter is not limited to illustrative examples of a particular array, attributes, clusters, or signal sample values.

Figure 9:
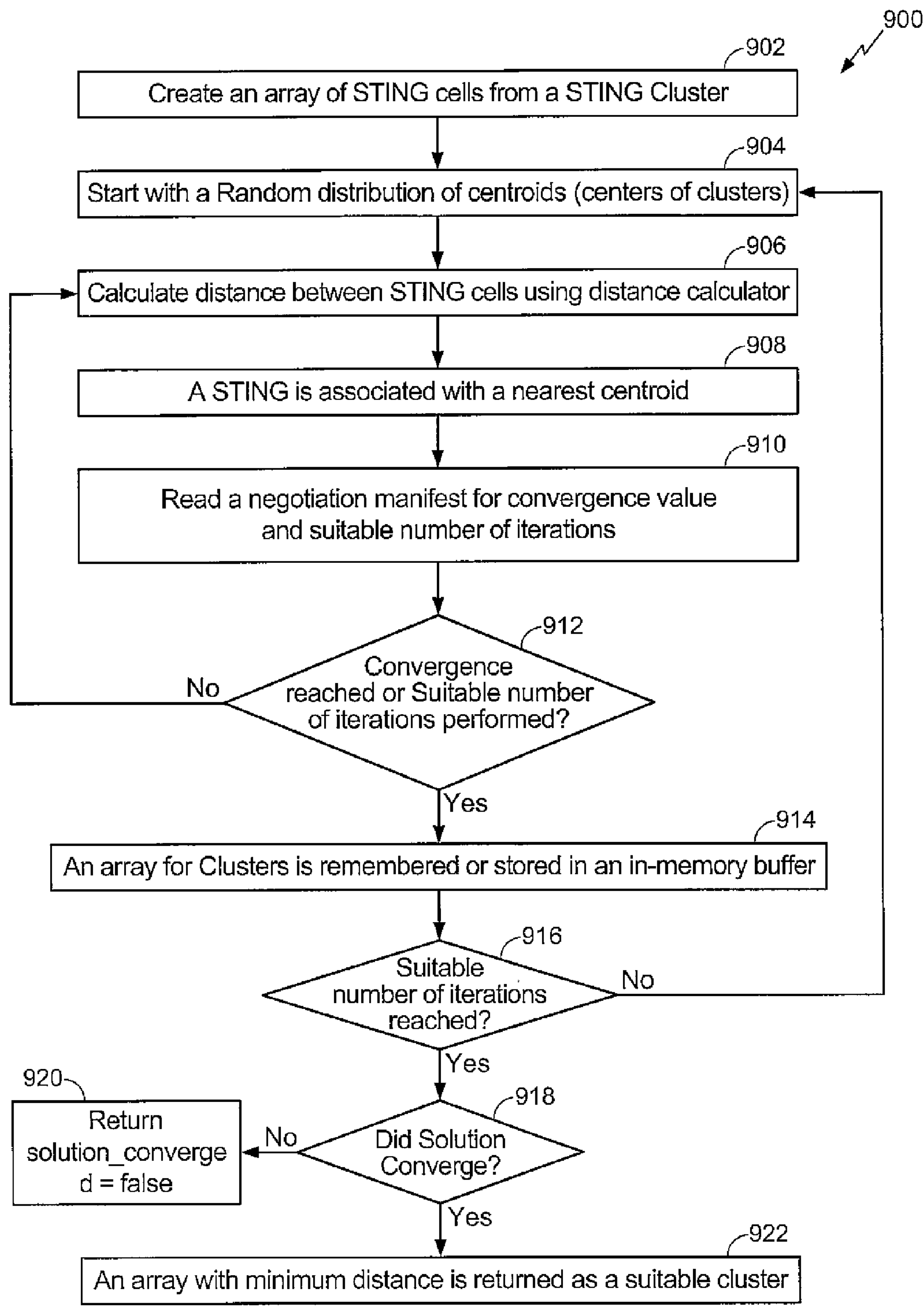
FIG. 9 is a flow diagram illustrating an example implementation of a clustering-type process.

FIG. 9 is a flow diagram illustrating an implementation of an example clustering-type training process 900 that may be implemented, in whole or in part, in connection with one or more k-means clustering operations. For example, process 900 may be implemented in connection with one or more operations. In an implementation clustering -based type may facilitated generation of one or more clusters of STING cell signal packets. For example, one or more momentized sampled signals may be represented, for example, via n-dimensional signal sample vectors, as previously described, for example. At operation 902, an array of STING cells may be generated such as, by grouping together one or more n-dimensional signal sample vectors identifiable from one or more STING clusters, for example. By way of example but not limitation, one possible example of an array of STING cells that may be used, at least in part, in connection with operation 902 may include an example illustrated at 812 in FIG. 8B.

With regard to operation 904, a process may initiate, for example, with a pseudo-random distribution of centroids for one or more clusters. For example, signal samples available, for example, via STING cell signal packets, may be pseudo-randomized via an application of a Brownian motion-type process, for example, to obtain one or more statistically suitable sample sets. Particular examples of one or more operations in connection with a pseudo-randomization technique that may be implemented in connection with operation 904 will be described in greater detail below with reference to FIG. 10.

At operation 906, proximity or dimensional distance between n-dimensional signal sample vectors may be calculated using, for example, an applicable distance calculator. At operation 908, a STING cell may be associated with a proximate centroid using one or more appropriate techniques, such as, for example, via a Voronoi diagram, though claimed subject matter is not so limited. At operation 910, a process may reference a manifest file for a sample value to assess convergence, suitable number of iterations, or the like.

At operation 912, an assessment may take place of a convergence threshold value or of iterations executed. A process may continue to operation 914 so as to store generated signal sample values, such as representative of a STING cluster array. For example, an array may be stored in a suitable in-memory buffer. In-memory buffers are known and need not be described here in greater detail. Likewise, a process may return to operation 906 to repeat one or more operations associated with operations 906-910, depending, for example, on the assessment performed.

With regard to operation 916, an example process 900 may proceed to operation 918 based at least in part on an assessment performed, as described above. In some instances, one or more signal sample values representative of one or more associated STING attributes may be identified in accordance with one or more STING cluster zones, for example. As referenced by a return arrow at 924, example process 900 may include repeating one or more operations, such as operations 904-916, for example, as previously described.

Depending, at least in part, on an assessment performed, at operation 922, a suitable array, such as an array of proximate STING attributes for example, may be generated. By way of example but not limitation, a suitable array may include an example array illustrated at 814 in FIG. 8B, though claimed subject matter is not limited to any illustrative examples. Alternatively, example process 900 may be terminated if, for example, subsequent assessment, as indicated generally at operation 920, suggest such a path. In some instances, for example, a "solution_converge d=false" notation may be stored or communicate, to illustrate one possible implementation.

Figure 10:
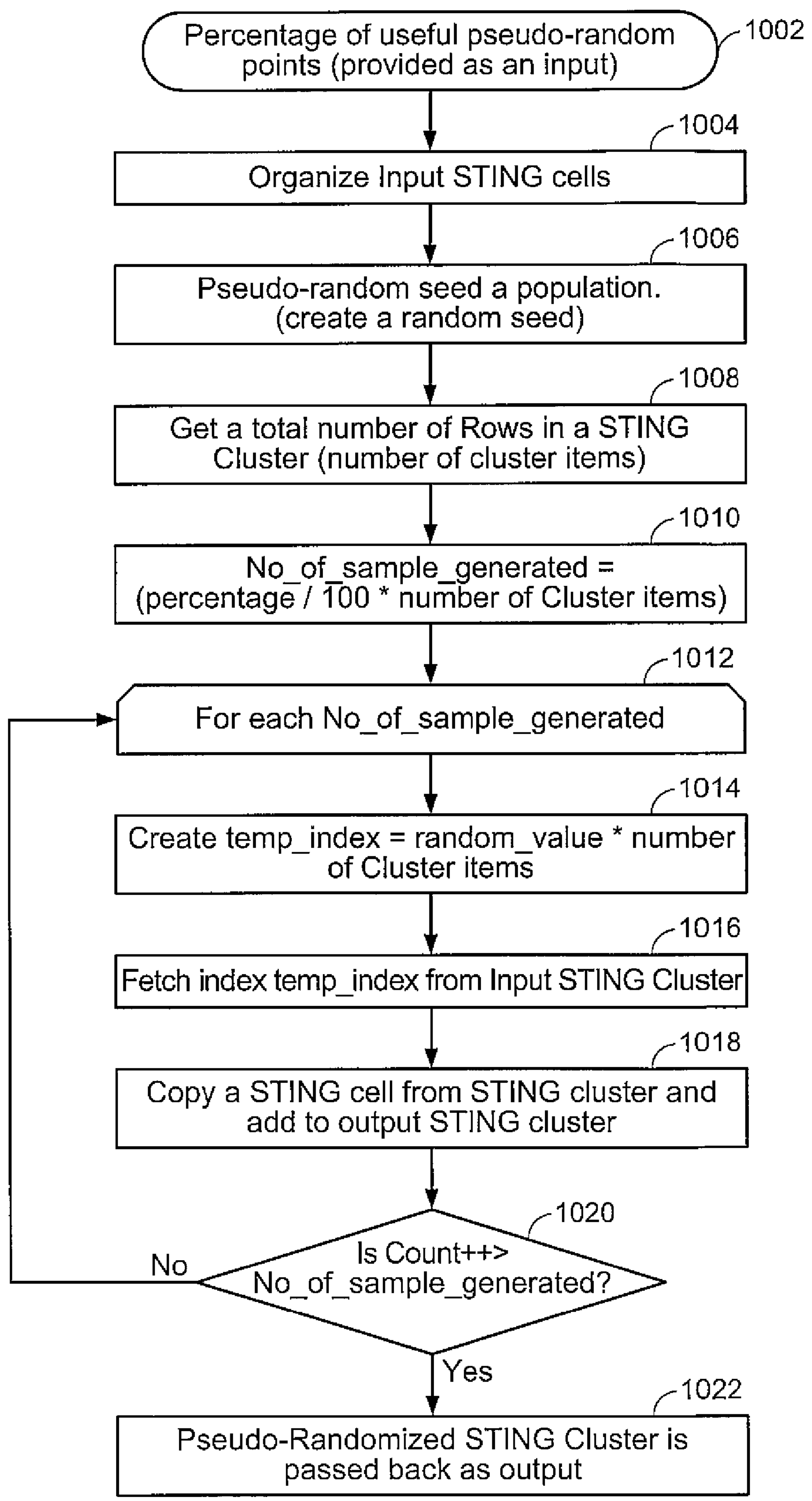
FIG. 10 is a flow diagram illustrating an example implementation of a pseudo-randomization-type process.

FIG. 10 is a flow diagram illustrating an implementation of an example pseudo-randomization-type process 1000 that may be implemented, in whole or in part, in connection with clustering-type training. For example, process 1000 may be implemented, at least in part, in connection with operation 904 of FIG. 9, though claimed subject matter is not so limited. It should be noted that process 1000 may be implemented, at least in part, in connection with correlation-type training, evolutionary training, or other space-time-node signal processing operations. Example process 1000 may begin at operation 1002 with pseudo-randomization of samples that may be useful for training, such as, for example, clustering-type training. With regard to operation 1006, a pseudo-random seed may be generated. Any appropriate process for generating a suitable pseudo-random sequence may be employed. At operation 1008, a selection of a percentage of available samples may be selected, as previously described.

As referenced at 1012, a temporary index may be generated. For example, optionally or alternatively, a systematic pseudo-random sampling approach may also be utilized. At operation 1020, it may be determined, for example, if a sample count is greater than a number of samples generated. For example, in one implementation, one or more pseudo-randomized STING clusters may comprise an array of pseudo-randomized STING cell signal packets that may be utilized, at least in part, in connection with clustering-type training, as previously mentioned. Of course, pseudo-randomization details are provided herein as a way of illustration, and claimed subject matter is not limited in this regard.

As previously mentioned, space-time-nodal type signal processing may comprise, for example, suitable correlation-type training. For example, correlation-type training may be implemented, in whole or in part, in connection with one or more space-time-nodal type signal processing operations, such as in connection with operation 224 of FIG. 2, to illustrate one possible implementation. In an implementation, as previously described, a suitable measure of statistical dependence or correlation may be employed, in whole or in part, with respect to signal sample vectors of interest as well as associated derivatives operations associated with example process 200 of FIG. 2.

In one implementation, one or more STING cell signal packets such as for a signal sample stream $A_i$ and a forecasted signal sample stream $F_i$, for example, may be represented such that:

$$A_i=\{x_i,y_i,z_i,t_i,N_i,v1_i,v2_i \ldots\} \text{ and } F_i=\{x_i,y_i,z_i,t_i,N_i,v1_i, v2_i \ldots\}.$$

For example, a process may reference an initialization or configuration-type file, to illustrate one possible implementation. By way of example but not limitation, an field "What_Order_Derivative_is_needed_for_Pearson'_training" in connection with manifest file 400 of FIG. 4 may be utilized, in whole or in part, though claimed subject matter is not so limited, of course.

Based, at least in part, on an applicable derivative, one or more momentized STING cell signal packets may be arranged. For example, in an implementation, momentized STING cell signal packets may be arranged in an array comprising one or more signal sample values of interest, such as values to be correlated, for example, as well as associated first, second, or third order derivatives, if applicable. By way of example but not limitation, a suitable array may be illustrated for example, by Table 3 below in connection with wind speed-related signal sample values, though claimed subject matter is not so limited. As seen, signal sample values, such as available by STING cell signal packets, may be organized via finite temporal moments (e.g., t1-t9, etc.) corresponding to signal sample values to be correlated (e.g., 12, 13, 14, etc.), as well as first, second, or third order derivatives, if applicable. For this example, first, second, or third-order derivatives are illustrated using Leibniz's notation for differentiation, wherein x denotes signal sample value vectors of interest $\mathbf{v1}_i,\mathbf{v2}_i$, etc. Signal sample values to be correlated may be selected, such as, for example, via pseudo-randomization techniques though claimed subject matter is not so limited.

TABLE 3

Example array of wind speed-related signal sample values.

| | | $\frac{dx}{dt}$ | $\frac{d^2x}{dt^2}$ | $\frac{d^3x}{dt^3}$ |
|---|---|---|---|---|
| t1 | 12 | | | |
| t2 | 13 | 1 | | |
| t3 | 14 | 1 | 0 | |
| t4 | 15 | 1 | 0 | 0 |
| t5 | 16 | 1 | 0 | 0 |
| t6 | 19 | 3 | 2 | 2 |
| t7 | 12 | −7 | −10 | −12 |
| t8 | 14 | 2 | 9 | 19 |
| t9 | 25 | 11 | 9 | 0 |

As a way of illustration, one or more signal sample values may correlate sufficiently well (e.g., t3-t5, etc.), if their respective rates of change over time or signal vector derivatives, for example, tend to zero relatively quickly. By contrast, derivatives of signal sample values of interest with a tendency to differentiate at values that are not at zero (e.g., t6-t8, etc.), for example, may indicate signal correlation that may not be sufficient. Of course, this is merely an illustrative example, and claimed subject matter is not so limited.

In an implementation, a Pearson's correlation coefficient r may be employed, for example, with respect to momentized n-dimensional signal sample vectors $A_i$ and $F_i$ discussed above, and associated first, second, or third-order derivatives. Thus, consider, for example:

$$r = \frac{\sum_{i=1}^{n}(x_i - \overline{x})(y_i - \overline{y})}{\sqrt{\sum_{i=1}^{n}(x_i - \overline{x})^2}\sqrt{\sum_{i=1}^{n}(y_i - \overline{y})^2}} \tag{2}$$

where $x_i$ and $y_i$ denote first, second, or third-order derivatives, if applicable; and $\overline{x}$ and $\overline{y}$ denote sample averages or sample means.

Figure 11:
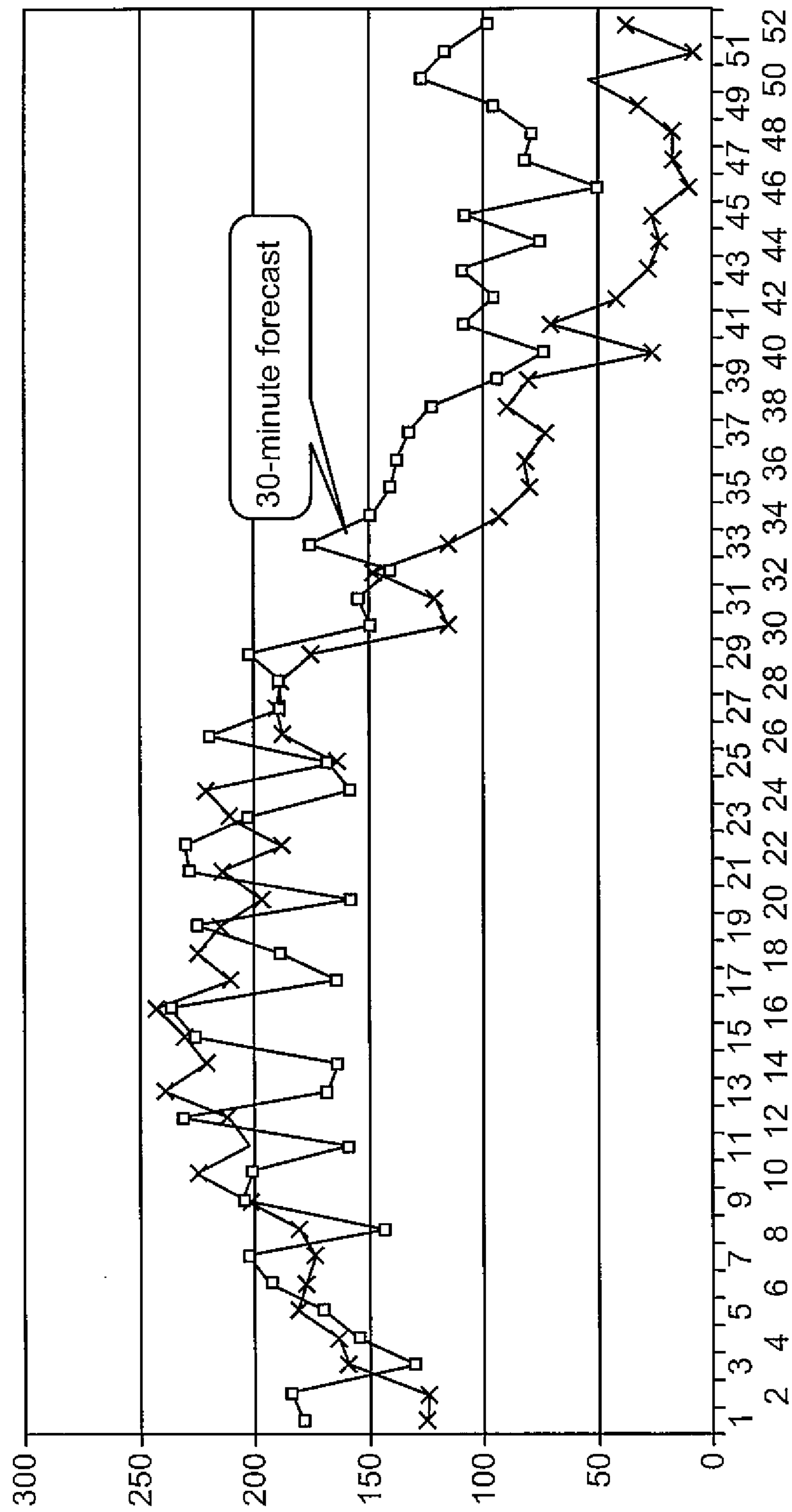
FIG. 11 illustrates example results for a set of signal sample values.
Figure 12:
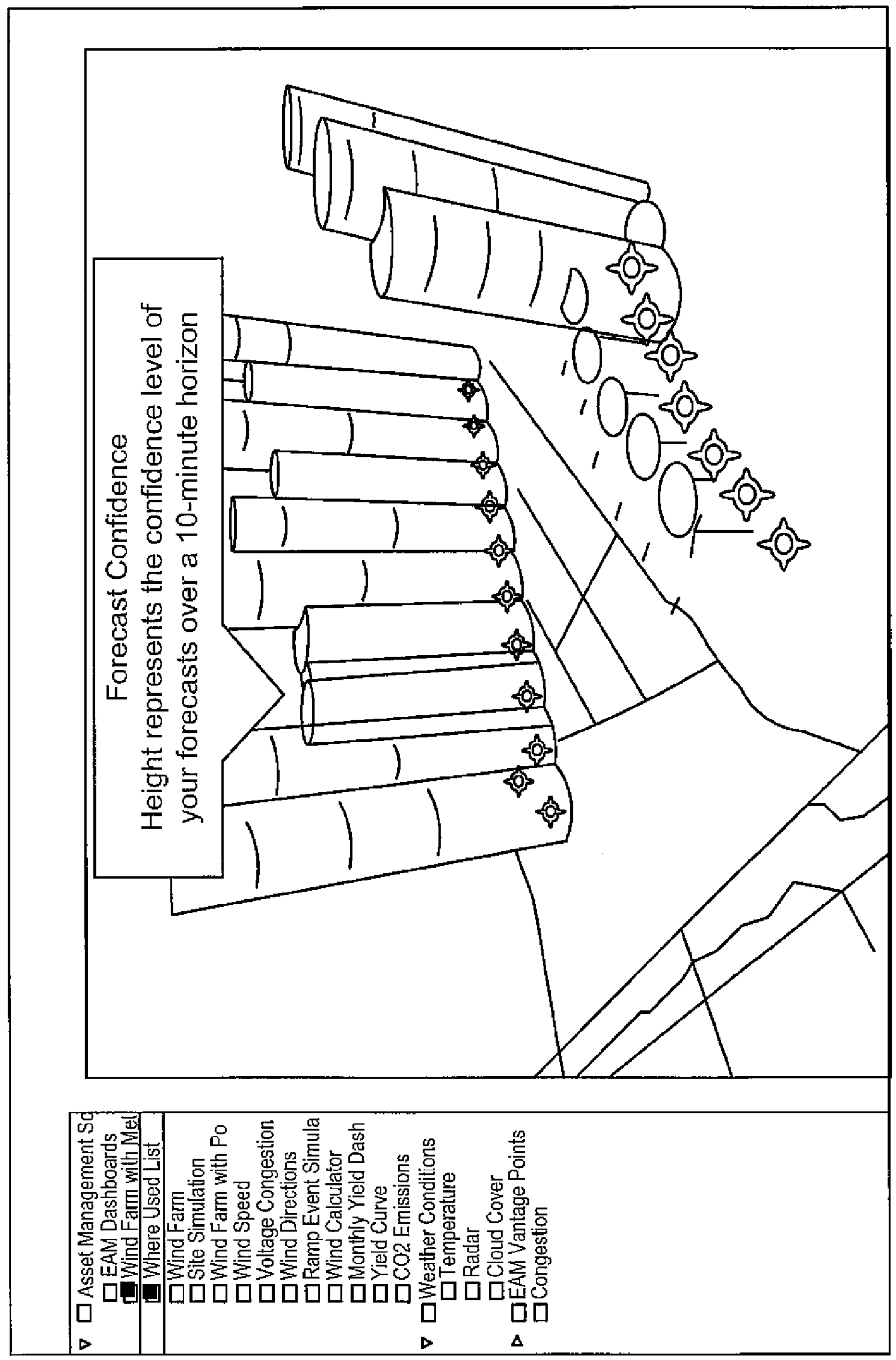
FIG. 12 is an example implementation of an interface illustrating forecast confidence.

By way of example but not limitation, example results for two signal sample vectors of interest, such as in connection with wind speed-related signal sample values, are illustrated in FIG. 11. For example, temporal trends for an example 30-minute forecast correlation may be evaluated. For example, a confidence level with respect to one or more signal-related attributes may be employed. For example, one or more signal-related attributes may exhibit a behavior indicating less confidence and, thus, may be addressed accordingly. It should be appreciated that this is merely an illustrative example and claimed subject matter is not so limited.

By way of example but not limitation, reliability of an estimate that a particular gust of wind may lead to a certain drop in wind energy production, for example, may illustrate one possible implementation. For example, a confidence level may be represented via an interface such as, for example, a graphical user interface, such as may provide a visual representation. One possible example of an interface may include one illustrated in FIG. 12. For example, a confidence level may be estimated, at least in part, as a function of historical correlation via computation of Pearson's correlation coefficient over space and time, such as, for example, correlation of wind speeds over 10-minute time horizon. In some instances, a confidence level may be graphically represented, for example, in connection with samples realized via spatially or geographically distributed wind sensors. Claimed subject matter is not limited to an interface illustrated, of course.

Continuing with the above discussion, signal-related attributes may be employed that are more mutually proximate, for example. In one implementation, for example, to evaluate correlation between two 30-minute trends for a signal stream and its forecast, a set of signal sample values may be computed, for example, in conjunction with use of Pearson's correlation coefficient R, though claimed subject matter is not so limited.

R30=0.95 for derivative order 0.

R30=0.93 for derivative order 1.

R30=0.91 for derivative order 2.

By way of example but not limitation, an example table comprising results of correlation-type training in connection with signal sample values illustrated above may include an example shown in Table 4 below. Of course, signal sample values or format shown are merely examples to which claimed subject matter is not limited.

TABLE 4

Example correlation-type training signal sample values.

| Training_Run_ID | Result_Variable | Signal1_vector_ID | Signal2_vector_ID | Derivative_order | Pearsons_coefficient |
|---|---|---|---|---|---|
| Run_1 | R_30 | {A1} | {F1} | 0 | 0.95 |
| Run_1 | R_30 | {A1} | {F1} | 1 | 0.93 |
| Run_1 | R_30 | {A1} | {F1} | 2 | 0.91 |

Figure 13:
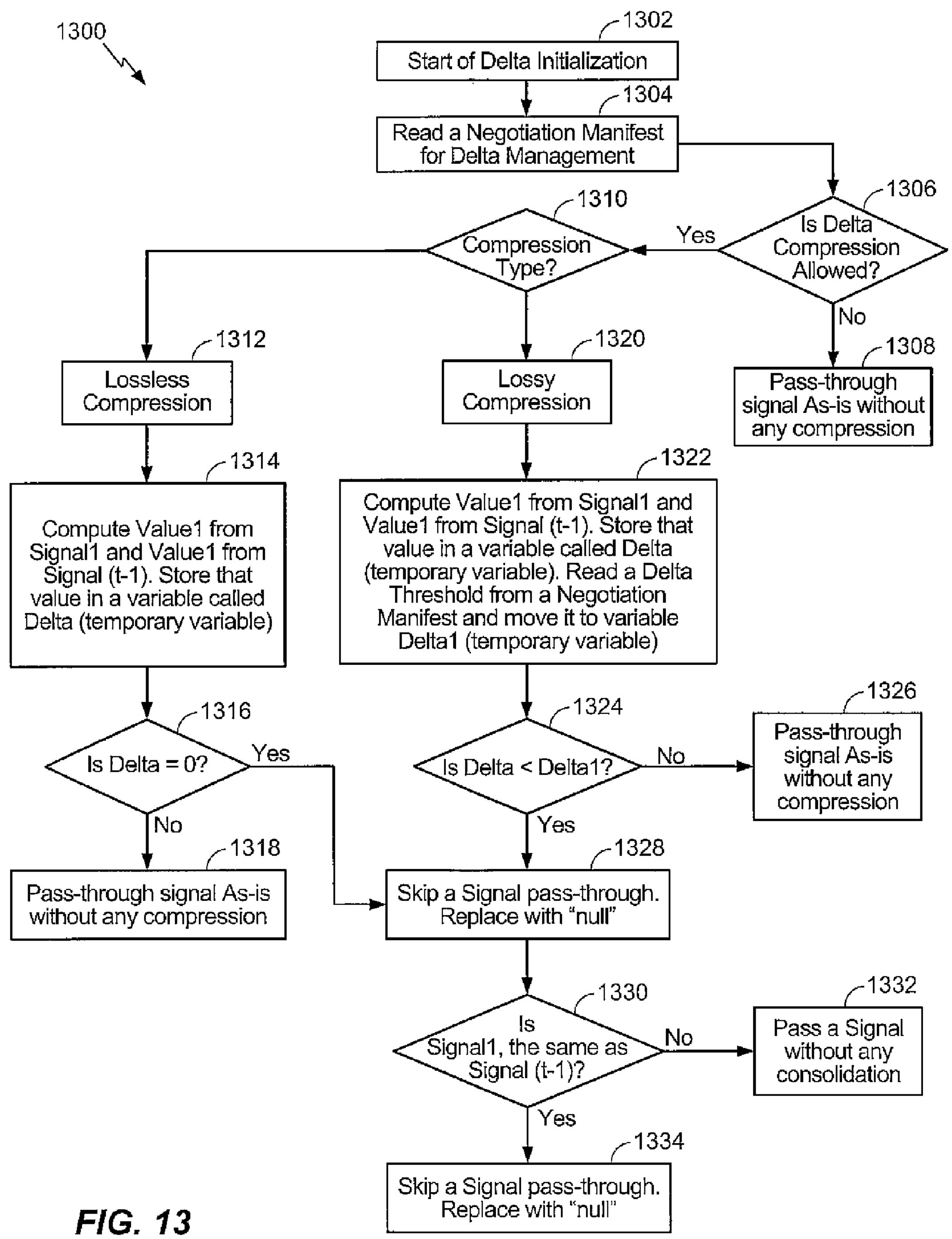
FIG. 13 is a flow diagram illustrating an implementation of an example process in connection with delta processing.

FIG. 13 is a flow diagram illustrating an implementation of an example process 1300 that may be implemented, in whole or in part, in connection with one or more delta processing operations or techniques, such as, for example, operation 246 of FIG. 2. Example process 1300 may begin, for example, with delta initialization at operation 1302. Initial signal sample values may, for example, be employed for one or more attributes of one or more sampled signals. At operation 1304, a process may, for example, read an INI-type file (e.g., negotiation manifest 400, etc.) for delta management. In an implementation, example process 1300 may proceed to operation 1310 to determine a type of delta compression, such as, for example, lossless compression, lossy compression, or the like, or any combination thereof. In some instances, a determination may be made based, at least in part, on a suitable factory, such as, for example, a compression-related factory structured in connection with a Java™ class implementation, though claimed subject matter is not so limited. Other suitable approaches that may or may not call factory classes may also be used.

At operation 1312, a lossless compression technique may be implemented, for example. At operation 1320, a lossy compression technique, for example, may be implemented. For example, a process may reference an INI-type file, such as manifest 400, for example.

In an implementation, for example, if Delta threshold is less that a value, compression may not be employed. To illustrate, if a sampled temperature registers at 60 degrees of Fahrenheit (e.g., Value 1, etc.) at a certain point in time (e.g., t, etc.) and subsequently registers at 63 degrees (e.g., Value 1, etc.) at some later time (e.g., t−1, etc.), a Delta threshold of 2 degrees, for example, may allow for a transmission with employing compression. If, however, temperature subsequently registers at 61 degrees at some later time (e.g., t−1, etc.), a signal sample value in a corresponding STING cell would be replaced with "null" value (e.g., at operation 1328 of FIG. 13, etc.). Of course, signal sample values or a Delta threshold are merely illustrative examples, and claimed subject matter is not so limited.

Figure 14:
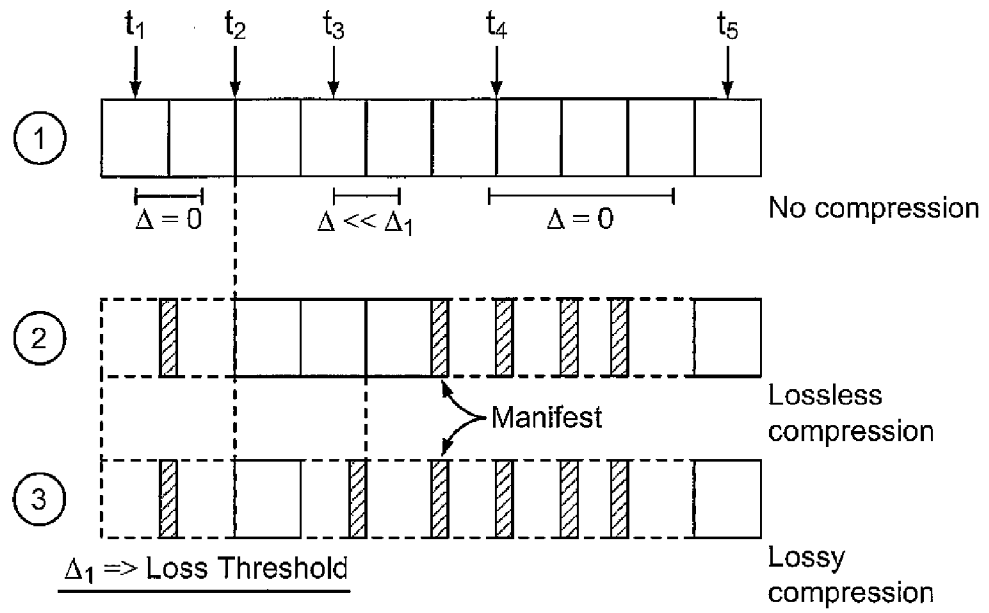
FIG. 14 is a schematic representation illustrating types of compression.

FIG. 14 is a schematic representation illustrating various types of compression that may be implemented, at least in part, in connection with one or more operations of process 1300 of FIG. 13. For purposes of illustration, a momentized sampled signal is represented comprising temperature-related signal sample values t1-t5, though claimed subject matter is not so limited. For example, if delta compression threshold $\Delta_1=0$, a signal sample value of interest may be transmitted, for example, without compression. For lossless compression, if $\Delta_1=0$, a process may, for example, transmit, such that a recipient may infer communication is on-going. For example, a payload may not include any signal sample values; however, a communication channel may remain. For lossy compression, for example, if $\Delta<\Delta_1$, a signal sample value may be replaced with "null," in an implementation.

Figure 15:
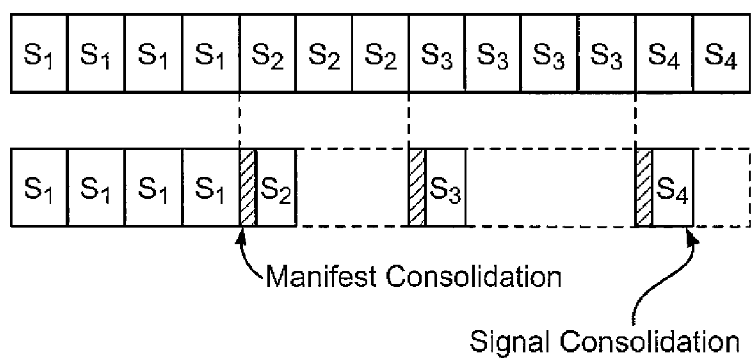
FIG. 15 is a schematic representation of an implementation of an example manifest.
Figure 17:
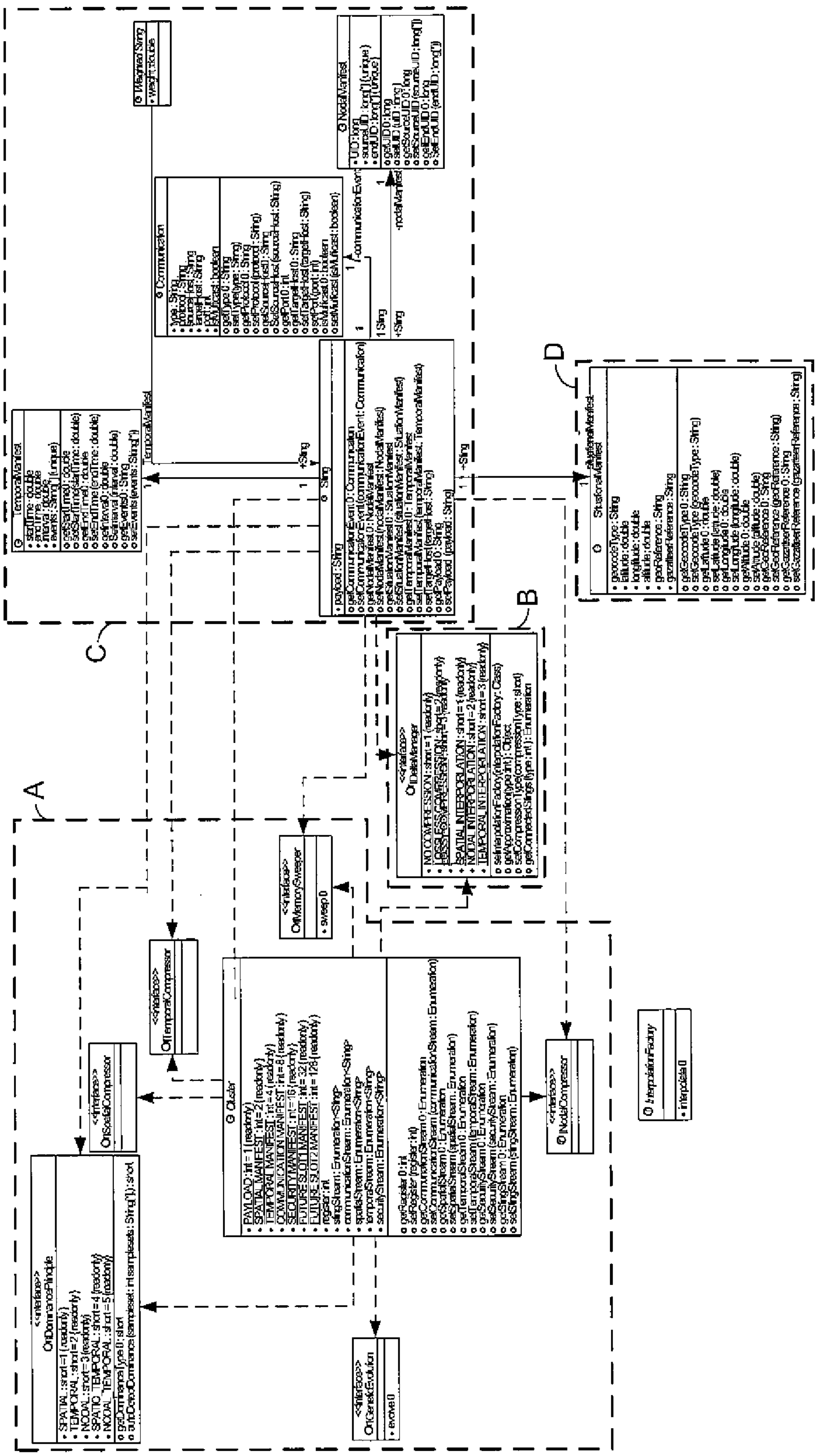
FIG. 17 is a schematic representation of an implementation of an example UML-type diagram.
Figure 17A:
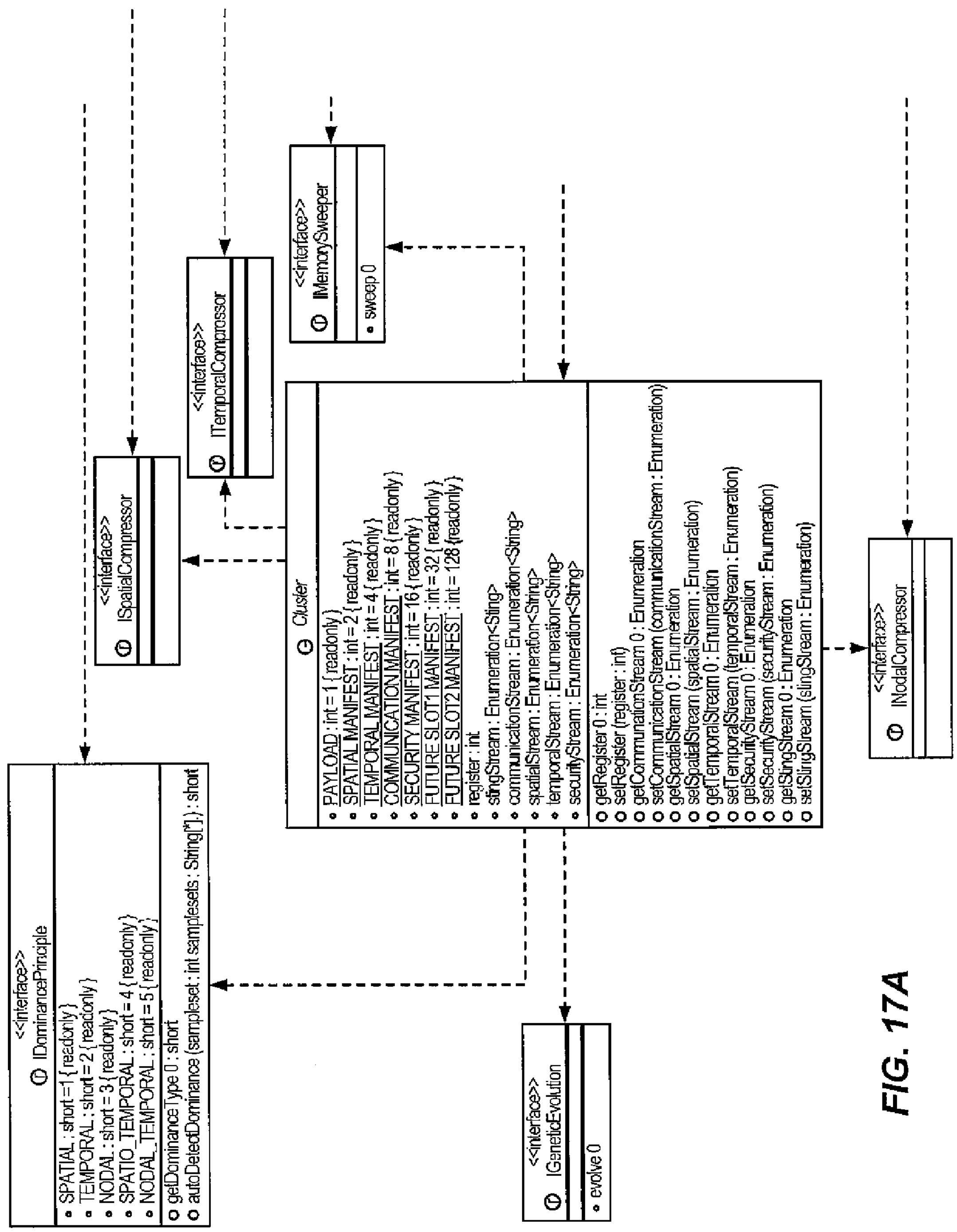
FIGS. 17A, 17B, 17C, and 17D are respective enlarged areas A, B, C, and D of the diagram of FIG. 17.
Figure 17B:
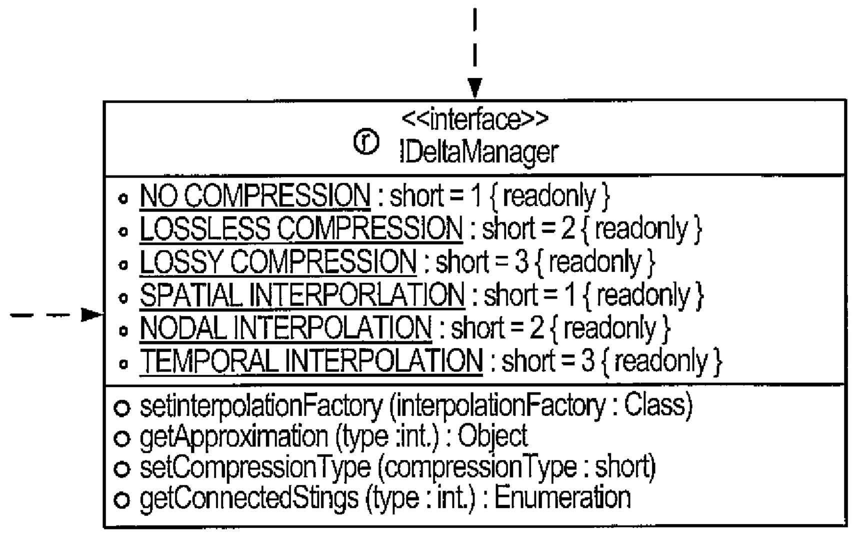
Figure 17D:
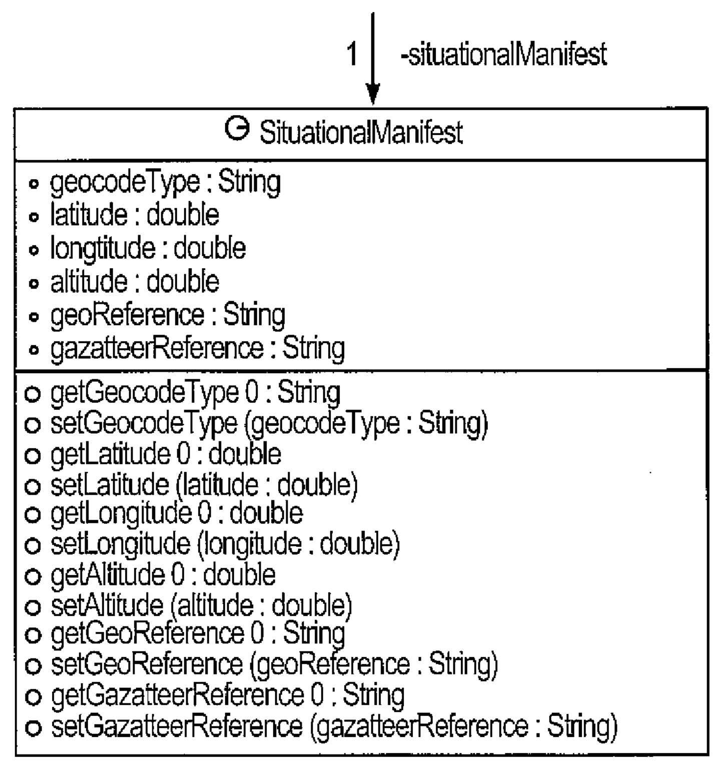
Figure 17C:
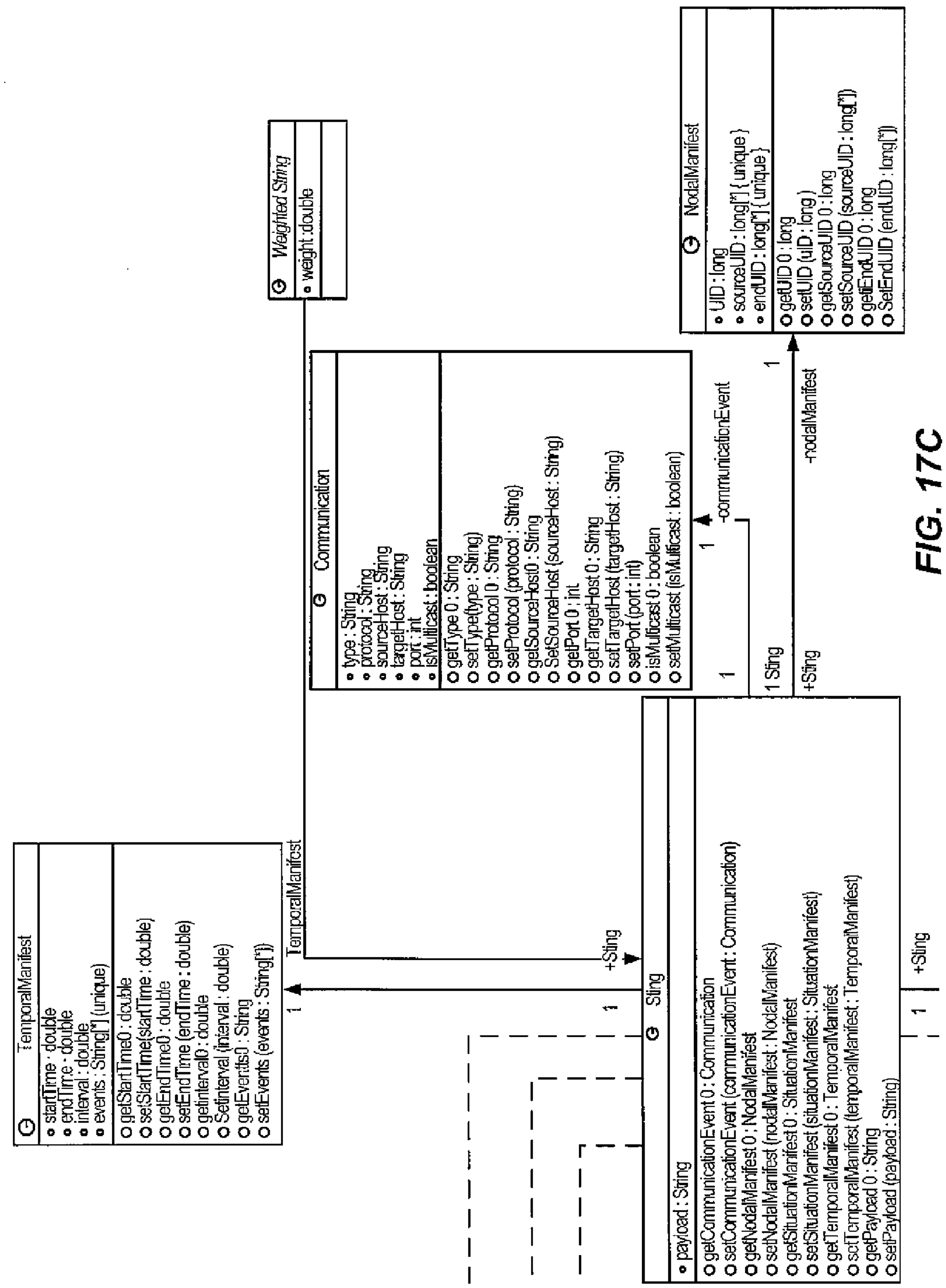

FIG. 15 is a schematic representation of an implementation of an example signal compression technique that may be implemented, at least in part, in connection with one or more delta processing operations. For example, one or more signal sample values may be representative of one or more attributes associated with one or more sampled signal, such as, for example, attributes discussed in connection with FIG. 3A. In some instances, a manifest may characterize, for example, a suitable form. An example compression technique is illustrated in connection with GPS-type signals, though claimed subject matter is not so limited. GPS-type signals, which are schematically represented via portions of a signal packet S1-S4, for example, may not change or may change relatively little over time. As illustrated, if a sampled signal is repeated (e.g., S1, S1, S1, S1, etc.), for example, it is possible to omit further transmission, for example, without performance degradation. Rather, system resources may instead be more effectively conserved. If, however, a change takes place (e.g., from S1 to S2, etc.), communications may be employed one time, such as initiated by a signal change.

As described previously, one or more sampled signals may be represented, for example, via one or more n-dimensional signal sample vectors, such that $S_i=\{x_i,y_i,z_i,t_i,N_i,v\mathbf{1}_i,v\mathbf{2}_i \ldots\}$. Thus, dimensional distance, such as $S_1=\{x_1,y_1,z_1,t_1,N_1,v\mathbf{1}_1, v\mathbf{2}_i \ldots\}$ and $S_2=\{x_2,y_2,z_2,t_2,N_2,v\mathbf{1}_2,v\mathbf{2}_2 \ldots\}$ may be characterized, for example, as $D_{12}$=distance($S_1,S_2$).

Examples of implementations of particular calculations are provided below. Of course, these are illustrative examples and claimed subject matter is not limited in scope to these examples.

SPATIAL2D. Spatial Euclidean distance for a two-dimensional or {X,Y} plane, distance $D_{12}$, may be calculated using, for example, the following Relation:

$$D_{12}=\sqrt{(x_2-x_1)^2+(y_2-y_1)^2} \quad (6)$$

SPATIAL3D. Spatial Euclidean distance for a three-dimensional or {X, Y, Z} plane, $D_{12}$ may be calculated, for example, as:

$$D_{12}=\sqrt{(x_2-x_1)^2+(y_2-y_1)^2+(z_2-z_1)^2} \quad (7)$$

SPATIO_TEMPORAL. Spatio-Temporal Euclidean distance in a {X, Y, Z, T} plane or dimension, distance $D_{12}$ may be calculated as:

$$D_{12}=\sqrt{(K(t_2-t_1))^2+(x_2-x_1)^2+(y_2-y_1)^2+(z_2-z_1)^2} \quad (8)$$

where K denotes a dimensional factor conversion notated in a unit that comprises a {distance measure}/{time measure}. In one implementation, K=1 may be used, though claimed subject matter is not so limited.

SPATIO_NDIMENSIONAL. Euclidean Distance in an N-dimensional plane or domain, distance $D_{12}$ may be calculated, for example, using the following relation:

$$D_{12}=\sqrt{\sum_{i=1}^{n}(p_{1i}-p_{2i})^2} \quad (9)$$

where $p_i$ comprises the $i^{th}$ component vector out of n components, such that, for example, $p_{11}=x_1$ and $p_{12}=y_1$ and . . . $p_{1n}=v\mathbf{1}_2$.

TEMPORAL. Difference in time-related moments, distance $D_{12}$, may be defined, for example, as:

$$D_{12}=t_2-t_1 \quad (10)$$

NODAL_DISTANCE_AFFINITY. Distance between nodes, for two sampled signals, such as, for example, signals $S_1=\{x_1,y_1,z_1,t_1,N_1,v\mathbf{1}_1,v\mathbf{2}_1 \ldots\}$ and $S_2=\{x_2,y_2,z_2,t_2,N_2,v\mathbf{1}_2, v\mathbf{2}_2 \ldots\}$, having sample value vectors $v\mathbf{1}_i v\mathbf{2}_i$, distance $D_{12}$, may be computed, at least in part, by utilizing the Hamming distance measure or $D_{ij}$, just to illustrate one possible implementation. Thus, by way of example but not limitation, the following approach may be used:

For example, a signal sample value vector may be compared against a similar signal sample value vector, such that $v\mathbf{1}_1=v\mathbf{1}_2$? $v\mathbf{2}_1=v\mathbf{2}_2$? $v\mathbf{3}_1=v\mathbf{3}_2$? $v\mathbf{4}_1=v\mathbf{4}_2$?

and so forth through, for example, $v\mathbf{7}_1=v\mathbf{7}_2$?, depending, at least in part, on implementation.

A signal sample value may be generated in a binary format. For example, $Bitmap_1$ =

| Binary($v1_1$) | Binary($v2_1$) | Binary($v3_1$) | ... | Binary($v7_1$) |
|---|---|---|---|---|

For purposes of explanation, a word like "hello" may be represented as: 0110100001100101011011000110110001101111.

To compute the Hamming distance, for example, use the following:

$$D_{ij}=\text{HammingDistance}(\text{Bitmap}_i,\text{Bitmap}_j)$$

A Hamming distance may be utilized, for example, to identify related nodes, such as in a socio-gram or graph-type relationship. Hamming computations are known and need not be described here in greater detail.

NODAL_DISTANCE_DEGREE_OF_SEPARATION. Distance between nodes based, at least in part, on degree of separation within a graph, distance $D_{12}$, may refer to a distance between two nodes in a graph calculated using a smallest number of links connecting nodes. An example Nodal Distance Degree of Separation calculator may be illustrated with reference to FIG. 16. For graph 1600, two nodes, such as nodes 4 and 8, for example, may be represented via signal sample vectors as $S_4\{x_4,y_4z_4t_4N_4v\mathbf{1}_4,v\mathbf{2}_4 \ldots\}$and $S_8=\{x_8y_8z_8t_8N_8v\mathbf{1}_8v\mathbf{2}_8 \ldots\}$, respectively. For example, node 4 may be traversed to node 8 by following links to nodes 3, 7, 6, and 2, respectively. However, node 4 may also be traversed to node 8 by following one link or edge. Accordingly, a distance calculator may navigate to arrive from node 4 to node 8, via 1 link. As such, degree of separation between signals $S_4$ and $S_8$ is 1 or $[d_{4,8}=1]$.

Further, a mean of distances for graph 1600 may be computed. For example, for a node, compute degree of separation with respect to other nodes. By way of example but not limitation, for Signal 1, a degree of separation with respect to other nodes in graph 1600 may include those illustrated in Table 3 below, though claimed subject matter is not so limited.

TABLE 3

| Examples of degrees of separation for Node | |
|---|---|
| Signal 1 -> Signal 2 | 1 |
| Signal 1 -> Signal 3 | 1 |
| Signal 1 -> Signal 4 | 1 |
| Signal 1 -> Signal 5 | 2 |
| Signal 1 -> Signal 6 | 2 |
| Signal 1 -> Signal 7 | 2 |
| Signal 1 -> Signal 8 | 1 |

Accordingly, here, a mean of distances for Signal 1 may be computed as {1+1+1+1+2+2+2}=10/7=1.43.

By way of example but not limitation, an approach to measuring degree of separation with respect to other nodes is illustrated in Table 3 below, though claimed subject matter is not so limited. Thus, consider:

TABLE 4

| Example of determining degree of separation | |
|---|---|
| Signal 1 -> Signal 2 | 1 |
| Signal 1 -> Signal 3 | 1 |
| Signal 1 -> Signal 4 | 1 |
| Signal 1 -> Signal 5 | 2 |
| Signal 1 -> Signal 6 | 2 |
| Signal 1 -> Signal 7 | 2 |
| Signal 1 -> Signal 8 | 1 |
| Signal 2 -> Signal 1 | <double counted> so eliminate from calculation |
| Signal 2 -> Signal 3 | 2 |
| Signal 2 -> Signal 4 | 2 |
| . . . | |
| . . . | |
| Signal 8 -> Signal 6 | 1 |
| Signal 8 -> Signal 7 | 2 |

Likewise, a mean of distances for graph 1600 may be computed in a similar fashion.

Accordingly, a distance $D_{12}$ between two nodes of interest may be calculated as a degree of separation as follows:

$$D_{12}=[\text{degree of separation}]/[\text{mean of distances}] \quad (11)$$

Figure 7:
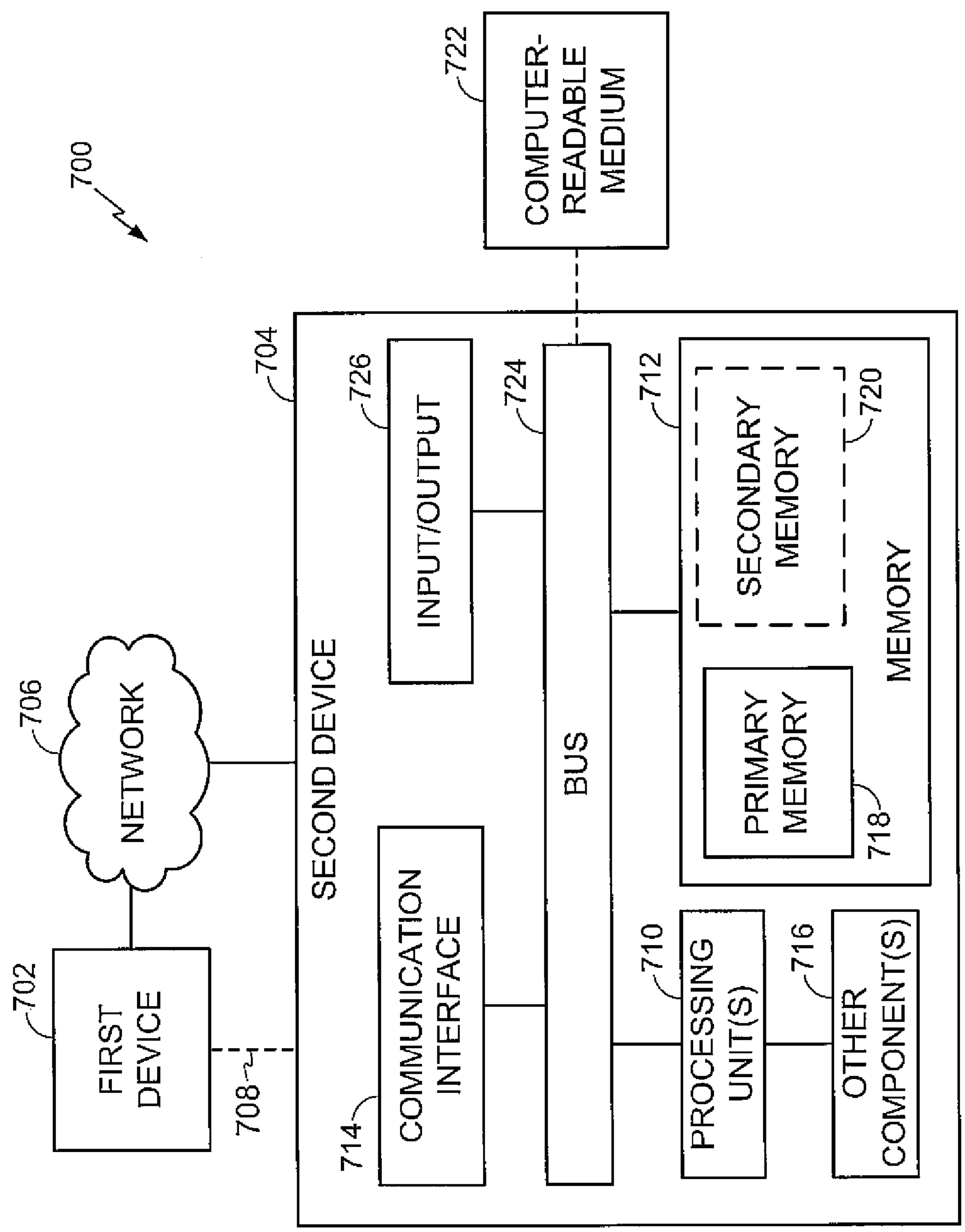
FIG. 7 is a schematic diagram illustrating an example implementation of a computing environment.

FIG. 7 is a schematic diagram illustrating an implementation of an example computing environment 700 that may include one or more devices or platforms capable of partially or substantially implementing one or more processes or operations in connection with a space-time-node engine signal processing. Computing environment system 700 may include, for example, a first device 702 and a second device 704, which may be operatively coupled together via a network 706, though claimed subject matter is not so limited. For example, first device 702 and a second device 704 may be operatively coupled together via a communication link 708, which may or may not be associated with network 706. Optionally or alternatively, first device 702 and second device 704 may comprise or be a part of a certain computing platform, such as a platform associated, for example, with a space-time-node engine. In an implementation, first device 702 and second device 704 may be representative of any electronic device, appliance, machine, or the like that may have capability to exchange signal information, such as multi-source information, for example, over network 706, communication link 708, or the like. Network 706 may represent one or more communication links, processes, or resources having capability to facilitate or support exchange or communication of signal information between first device 702, second device 704, or the like.

In an implementation, first device 702 or second device 704 may be capable of facilitating or supporting one or more processes or operations associated with computing environment 700, such as, for example, process 200 of FIG. 2, process 800 of FIG. 8A, process 900 of FIG. 9, or the like. As previously mentioned, first device 702 may comprise, for example, a sensor associated with a signal acquisition point, just to illustrate one possible implementation. Second device 704 may comprise, for example, at least one processor and memory that may be configurable to exchange data or information over any suitable communications network. For example, second device 704 may include one or more computing devices or platforms capable of communicating with, for example, a laptop computer, a desktop computer, a tablet PC, a cellular telephone, an access point, a transceiver chip, an e-book reader, a workstation, a server device, a data storage unit, a file system, a sensor, or the like. In certain implementations, first device 704 or second device 704 may take the form of one or more integrated circuits, circuit boards, or the like that may be operatively enabled for use in another device.

It should be appreciated that all or part of various components shown in connection with computing environment 700, or the processes or operations as described herein, may be implemented using or otherwise include hardware, firmware, or any combination thereof along with software. It should also be noted that computing environment 700 may include more, fewer, or different components from those that are illustrated. Although not shown, optionally or alternatively, there may be additional devices operatively coupled to first device 702, second device 704, etc. to facilitate or otherwise support one or more processes or operations associated with computing environment 700. Thus, unless stated otherwise, to simplify discussion, various functionalities, elements, components, etc. as described below with reference to second device 704 may also be applicable to other devices, such as first device 702, for example, or devices not shown so as to facilitate or support one or more processes associated with example computing environment 700.

As illustrated, second device 704 may include at least one processing unit 710, memory 712, communication interface 714, and one or more other components, indicated generally at 77, for example, so as to facilitate or support one or more processes or operations in connection with a space-time-node engine signal structure. Processing unit 710 may be implemented in hardware or a combination of hardware and software. Processing unit 710 may be representative of one or more circuits configurable to perform at least a portion of information computing techniques or processes. By way of example but not limitation, processing unit 710 may include one or more processors, controllers, microprocessors, microcontrollers, application specific integrated circuits, digital signal processors, programmable logic devices, field programmable gate arrays, etc., or any combination thereof.

Memory 712 may store, comprise, or otherwise provide access to computer-readable instructions, such as a program, an application, etc. or portion(s) thereof, including, for example, initialization or configuration files, information structures, processor-executable instructions or code, or the like that may be accessible or executable by processing unit 710. Execution of such instructions by processing unit 710 may transform second device 704 into a special purpose computing device, apparatus, platform, etc., or some combination thereof. Memory 712 may represent any information or signal storage medium or mechanism. For example, memory 712 may include a primary memory 718 and a secondary memory 720. Primary memory 718 may include, for example, a random access memory, read only memory, or the like and may comprise information with respect to one or more training signal datasets, cardinality maps, indexing options, manifest classes or properties, linearized values, STING cells or clusters, various thresholds (e.g., sweep angle, radius, etc.) dominant attributes, or other suitable or desires information to facilitate or support one or more processes or operations in connection with a space-time-node engine signal structure. While illustrated in this example as being separate from processing unit 710, it should be appreciated that all or part of memory 712 may be provided within or otherwise co-located/coupled with processing unit 710.

Secondary memory 720 may include, for example, the same or similar type of memory as primary memory. In certain implementations, secondary memory 720 may comprise, for example, one or more information storage devices or systems, such as, for example, a disk drive, an optical disc drive, a tape drive, a solid state memory drive, or the like. Secondary memory 720 may be operatively receptive of, or otherwise enabled to be coupled to, a computer-readable medium 722. Computer-readable medium 722 may include, for example, any storage medium capable of storing or providing access to information, code, or instructions (e.g., an article of manufacture, etc.) for second device 704 or any other device associated with computing environment 700. It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Computer-readable medium 722 may be accessed by processing unit 710, for example. As such, in certain example implementations, the methods or apparatuses may take the form, in whole or in part, of a computer-readable medium that may include computer-implementable instructions stored thereon, which, if executed by at least one processing unit or other like circuitry, may enable processing unit 710 or the other like circuitry to perform all or portions of a memory sweep operation, or any operation or process to facilitate or otherwise support a space-time-node engine structure. In certain example implementations, processing unit 710 may be capable of performing or supporting other functions associated with computing environment 700, such as signal acquisition, training, presentation, communication, routing, or the like.

Communication interface 714 may allow for communication with one or more devices or systems associated with computing environment 700 over one or more wired or wireless communication links. In certain implementations, communication interface may comprise, for example, a function or class-type driver or adapter (e.g., a STING adapter, etc.) that may provide for or otherwise support communicative coupling between different levels or layers of an architecture or a part of an architecture associated with computing environment 700, as previously mentioned. Although not shown, second device 704 may include a power source to provide power to some or all of the components or circuitry. A power source may be a portable power source, such as a battery, for example, or may comprise a fixed or stationary power source, such as an outlet (e.g. In a building, electric charging station, car, etc.). It should be appreciated that a power source may be integrated into (e.g., built-in, etc.) or otherwise supported by (e.g., stand-alone, etc.) second device 704. A power source may also be a transportable power source, such as a solar panel, carbon-fuel-based generator, or the like. Also, components or circuitry of second device 704 may include an analog-to-digital converter (ADC) for digitizing output signals, for example.

Second device 704 may also include one or more buses or connections 724 (e.g., connectors, lines, conductors, optic fibers, etc.) to operatively couple various circuits or components together including, for example, one or more other components 77. As also seen, second device may comprise, for example, an input/output device 726. Input/output device 726 may represent one or more devices or features that may be able to accept or otherwise input human or machine instructions, or one or more devices or features that may be able to deliver or otherwise output human or machine instructions. By way of example but not limitation, input/output device may include, for example, a user interface, such as display, touch screen, keypad, buttons, knobs, microphone, speaker, trackball, data port, or the like. Other components 77, if present, may comprise one or more other device, features, functionalities, or the like capable of facilitating or supporting one or more operations or processes implemented by second device 704, such as operations in connection with a space-time-node engine signal structure, for example.

According to an implementation, one or more portions of a device associated with computing environment 700, such as first device 702, second device 704, or the like, for example, may store one or more binary digital electronic signals representative of information expressed as a particular state of a device. To illustrate, an electrical binary digital signal representative of information may be "stored" in a portion of memory 712 of second device 704 by affecting or changing a state of particular memory locations, for example, to represent information as binary digital electronic signals in the form of ones or zeros. As such, in a particular implementation of a device, such a change of state of a portion of a memory within a device, such a state of particular memory locations, for example, to store a binary digital electronic signal representative of information constitutes a transformation of a physical thing, such as memory 712, for example, to a different state or thing.

Some portions of the detailed description herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described or shown herein using various methods or systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to particular examples disclosed, but that claimed subject matter may also include all implementations falling within the scope of the appended claims, or equivalents thereof.

What is claimed is:

1. A method comprising:

processing a first plurality of digital signals having a second plurality of spatial-temporal-nodal attributes so as to generate a STING signal packet.

2. The method of claim 1, wherein said processing comprises employing clustering-type processing for said first plurality of digital signals having said second plurality of spatial-temporal-nodal attributes.

3. The method of claim 2, wherein said clustering-type processing comprises k-means clustering-type processing.

4. The method of claim 2, wherein said clustering-type processing results in at least partial compression of said first plurality of digital signals.

5. The method of claim 3, wherein said k-means clustering-type processing includes using, at least in part, a k-means dimensional evaluation.

6. The method of claim 1, wherein said STING signal packet comprises one or more sorted cluster zones.

7. The method of claim 6, wherein said one or more sorted cluster zones are sorted at least approximately in accordance with a dimensional distance metric.

8. The method of claim 7, wherein spatial separation of locations of said one or more sorted cluster zones within said STING signal packet corresponds at least approximately with a dimensional distance metric.

9. The method of claim 7, wherein said dimensional distance metric is at least partially in accordance with at least one of the following: Euclidian distance; Hamming distance; or any combination thereof.

10. The method of claim 1, wherein said processing comprises employing correlation-type processing for said first plurality of digital signals having said second plurality of spatial-temporal-nodal attributes.

11. The method of claim 10, wherein said correlation-type processing results in at least partial compression of said first plurality of digital signals.

12. The method of claim 10, wherein said correlation-type processing employs a Pearson's correlation coefficient at least partially.

13. A method comprising:

applying one or more digital signals to process at least one signal attribute in a spatial-temporal-nodal format; and generating one or more sets of one or more signal sample values in said format based, at least in part, on said applied one or more digital signals.

14. The method of claim 13, wherein said one or more digital signals are applied in connection with a clustering-based training.

15. The method of claim 14, wherein said clustering-based training is based, at least in part, on an application of a k-means clustering-type process.

16. The method of claim 15, wherein said k-means clustering-type process is performed in connection with a k-means dimensional analyzer.

17. The method of claim 13, and further comprising arranging said one or more sets of said one or more signal sample values in at least one array having one or more sorted cluster zones.

18. The method of claim 17, wherein said one or more sorted cluster zones comprise said one or more signal sample values arranged as a function of mutually relative distance.

19. The method of claim 18, wherein said distance is determined based, at least in part, on an application of a distance calculator.

20. The method of claim 19, wherein said distance calculator utilizes at least one of the following: a Euclidian distance-based metric; a Hamming distance-based metric; or any combination thereof.

21. The method of claim 13, wherein said one or more sets of said one or more signal sample values are generated in connection with a pseudo-randomization-type process.

22. The method of claim 13, wherein said one or more digital signals are applied in connection with a correlation-based training.

23. The method of claim 22, wherein said correlation-based training is based, at least in part, on a measure of dependence or correlation of at least one of the following: said one or more signal sample values; at least one derivative of said one or more signal sample values; or any combination thereof.

24. The method of claim 23, wherein said measure of dependence or correlation comprises a measure of statistical dependence or correlation.

25. The method of claim 24, wherein said measure of statistical dependence or correlation comprises a Pearson's correlation coefficient.

26. The method of claim 22, wherein said correlation-based training utilizes at least one distance-based metric with respect to said signal sample values.

27. The method of claim 26, wherein said at least one distance-based metric comprises a time-based metric.

28. The method of claim 22, wherein said one or more digital signals are applied to electronically estimate a confidence level with respect to said one or more attributes.

29. The method of claim 13, and further comprising:
performing a delta processing operation with respect to said at least one signal attribute in said spatial-temporal-nodal format.

30. The method of claim 13, wherein said delta processing operation is performed in connection with at least one of the following: a lossless compression; a lossy compression; or any combination thereof.

31. The method of claim 13, wherein said at least one signal attribute comprises an attribute having a higher degree of cardinality.

32. The method of claim 31, wherein said higher degree of cardinality is determined based, at least in part, on an application of a dominance principle.

33. The method of claim 13, wherein said at least one signal attribute comprises an attribute to at least partially anticipate one or more user preferences.

34. An article comprising:
a non-transitory storage medium having instructions stored thereon executable by a special purpose computing platform to:
apply one or more digital signals to process at least one signal attribute in a spatial-temporal-nodal format; and
generate one or more sets of one or more signal sample values in said format based, at least in part, on said applied one or more digital signals.

35. The article of claim 34, wherein said one or more digital signals are applied in connection with a clustering-based training.

36. The article of claim 34, wherein said storage medium further includes instructions to arrange said one or more sets of said one or more signal sample values in at least one array having one or more sorted cluster zones.

37. The article of claim 36, wherein said one or more sorted cluster zones comprise said one or more signal sample values arranged as a function of mutually relative distance.

38. The article of claim 37, wherein said distance is determined based, at least in part, on an application of a distance calculator utilizing at least one of the following: a Euclidian distance-based metric; a Hamming distance-based metric; or any combination thereof.

39. The article of claim 34, wherein said one or more digital signals are applied in connection with a correlation-based training.

40. The article of claim 39, wherein said correlation-based training is based, at least in part, on a measure of dependence or correlation of at least one of the following: said one or more signal sample values; at least one derivative of said one or more signal sample values; or any combination thereof.

41. The article of claim 40, wherein said measure of dependence or correlation comprises a measure of statistical dependence or correlation.

42. The article of claim 39, wherein said correlation-based training utilizes at least one distance-based metric with respect to said signal sample values.

43. The article of claim 39, wherein said at least one distance-based metric comprises a time-based metric.

44. The article of claim 34, wherein said storage medium further includes instructions to perform a delta processing operation with respect to said at least one signal attribute in said spatial-temporal-nodal format.

45. The article of claim 34, wherein said at least one signal attribute comprises an attribute having a higher degree of cardinality determined based, at least in part, on an application of a dominance principle.

46. An apparatus comprising:
a computing platform comprising at least one processor to:
apply one or more digital signals to process at least one signal attribute in a spatial-temporal-nodal format; and
generate one or more sets of one or more signal sample values in said format based, at least in part, on said applied one or more digital signals.

47. The apparatus of claim 46, wherein said one or more digital signals are applied in connection with a clustering-based training.

48. The apparatus of claim 46, wherein said at least one processor is further to arrange said one or more sets of said one or more signal sample values in at least one array having one or more sorted cluster zones.

49. The apparatus of claim 48, wherein said one or more sorted cluster zones comprise said one or more signal sample values arranged as a function of mutually relative distance.

50. The apparatus of claim 46, wherein said one or more digital signals are applied in connection with a correlation-based training based, at least in part, on a measure of dependence or correlation of at least one of the following: said one or more signal sample values; at least one derivative of said one or more signal sample values; or any combination thereof.

51. The apparatus of claim 50, wherein said correlation-based training utilizes a time-based metric with respect to said signal sample values.

52. The apparatus of claim 46, wherein said at least one processor is further to perform a delta processing operation with respect to said at least one signal attribute in said spatial-temporal-nodal format.

53. The apparatus of claim 46, wherein said at least one signal attribute comprises an attribute to at least partially anticipate one or more user preferences.

* * * * *